US009882896B2

(12) United States Patent
Yang et al.

(10) Patent No.: US 9,882,896 B2
(45) Date of Patent: Jan. 30, 2018

(54) SYSTEM AND METHOD FOR SECURE LOGIN, AND APPARATUS FOR SAME

(71) Applicant: Rowem Inc., Guro-gu, Seoul (KR)

(72) Inventors: Giho Yang, Seoul (KR); Jaeyeob Hwang, Goyang-si (KR)

(73) Assignee: Rowem Inc. (KR)

( * ) Notice: Subject to any disclaimer, the term of this patent is extended or adjusted under 35 U.S.C. 154(b) by 14 days.

(21) Appl. No.: 14/655,868

(22) PCT Filed: Jun. 28, 2013

(86) PCT No.: PCT/KR2013/005764
§ 371 (c)(1),
(2) Date: Jun. 26, 2015

(87) PCT Pub. No.: WO2014/104507
PCT Pub. Date: Jul. 3, 2014

(65) Prior Publication Data
US 2015/0350178 A1 Dec. 3, 2015

(30) Foreign Application Priority Data

Dec. 27, 2012 (KR) .......................... 10-2012-0155630
Jun. 27, 2013 (KR) .......................... 10-2013-0074461

(51) Int. Cl.
*G06F 21/33* (2013.01)
*H04L 29/06* (2006.01)
(Continued)

(52) U.S. Cl.
CPC .......... *H04L 63/0853* (2013.01); *G06F 21/31* (2013.01); *G06F 21/32* (2013.01);
(Continued)

(58) Field of Classification Search
CPC ...................................................... G06F 21/33
See application file for complete search history.

(56) References Cited

U.S. PATENT DOCUMENTS 5,915,025 A * 6/1999 Taguchi ............... G06F 12/145
380/44
6,219,639 B1 * 4/2001 Bakis .................. G06K 9/00885
382/116
(Continued)

FOREIGN PATENT DOCUMENTS

CN 1917423 A 2/2007
CN 102664876 A 9/2012
(Continued)

OTHER PUBLICATIONS

International Search Report for International Application No. PCT/KR2013/005764 dated Oct. 18, 2013, 4 pages, Republic of Korea.

*Primary Examiner* — Josnel Jeudy
(74) *Attorney, Agent, or Firm* — Thorpe North & Western

(57) ABSTRACT

Disclosed is a safe log-in system and method for allowing log-in of a user in association with a plurality of devices, and an apparatus for the same. The safe log-in method for allowing a safe log-in of a communication device which accesses a web site includes, by an authentication data providing device, determining whether the authentication data providing device and the communication device are located at the same place; by the authentication data providing device, acquiring authentication-related data of the communication device when the authentication data providing device and the communication device are located at the same place as a result of the determination; and by the authentication data providing device, providing the acquired authentication-related data to the communication device or the web site.

65 Claims, 11 Drawing Sheets

(51) Int. Cl.
    *G06F 21/34* (2013.01)
    *G06F 21/32* (2013.01)
    *G06F 21/31* (2013.01)
(52) U.S. Cl.
    CPC .......... *G06F 21/34* (2013.01); *H04L 63/0428* (2013.01); *H04L 63/08* (2013.01); *H04L 63/0861* (2013.01)

(56) References Cited

U.S. PATENT DOCUMENTS

| | | | |
|---|---|---|---|
| 2005/0105734 A1 | 5/2005 | Buer et al. | |
| 2005/0268330 A1* | 12/2005 | Di Rienzo | G01S 5/14 726/4 |
| 2006/0064330 A1* | 3/2006 | Sumino | G06Q 40/08 705/4 |
| 2007/0043950 A1 | 2/2007 | Imanishi et al. | |
| 2007/0118891 A1 | 5/2007 | Buer | |
| 2007/0162597 A1 | 7/2007 | Tanaka et al. | |
| 2008/0060052 A1 | 3/2008 | Hwang | |
| 2008/0294896 A1* | 11/2008 | Noh | G06F 21/51 713/168 |
| 2009/0036100 A1 | 2/2009 | Lee | |
| 2010/0024017 A1 | 1/2010 | Ashfield et al. | |
| 2010/0151823 A1 | 6/2010 | Dagorn et al. | |
| 2010/0235637 A1 | 9/2010 | Lu et al. | |
| 2011/0077026 A1* | 3/2011 | Cousins | H04W 4/001 455/456.2 |
| 2011/0113477 A1 | 5/2011 | Miyabayashi et al. | |
| 2011/0154447 A1 | 6/2011 | Dennis et al. | |
| 2011/0207433 A1* | 8/2011 | Miyamoto | G06F 21/41 455/411 |
| 2013/0010962 A1 | 1/2013 | Buer et al. | |
| 2014/0096218 A1 | 4/2014 | Miyabayashi et al. | |
| 2015/0058620 A1 | 2/2015 | Buer et al. | |

FOREIGN PATENT DOCUMENTS

| | | |
|---|---|---|
| EP | 1 536 306 | 6/2005 |
| JP | 2002-157226 | 5/2002 |
| JP | 2002318788 | 10/2002 |
| JP | 2003108525 | 4/2003 |
| JP | 2004-151863 | 5/2004 |
| JP | 2006-165741 | 6/2006 |
| JP | 2007-094548 | 4/2007 |
| JP | 2007-148471 | 6/2007 |
| JP | 2007-520781 | 7/2007 |
| JP | 2008-090512 | 4/2008 |
| JP | 2008146551 | 6/2008 |
| JP | 2011-028687 | 2/2011 |
| JP | 2011-243017 | 12/2011 |
| JP | 2012-178085 | 9/2012 |
| KR | 2001-0000232 | 1/2001 |
| KR | 2001-0041363 | 5/2001 |
| KR | 2005-0030880 | 3/2005 |
| KR | 10-2005-0112146 | 11/2005 |
| KR | 10-2006-0054527 | 5/2006 |
| KR | 2009-0013432 | 2/2009 |
| KR | 2010-0006309 | 1/2010 |
| KR | 2012-0010899 | 2/2012 |
| WO | WO 1999/44114 | 9/1999 |
| WO | WO 2005/029216 | 3/2005 |
| WO | WO 2009/001197 | 12/2008 |

* cited by examiner

SYSTEM AND METHOD FOR SECURE LOGIN, AND APPARATUS FOR SAME

TECHNICAL FIELD

The present disclosure relates to a log-in processing technique, and more particularly, to a safe log-in system and method for allowing log-in of a user in association with a plurality of devices, and an apparatus for the same.

BACKGROUND ART

Password authentication is used as a universal method for user authentication. In the password authentication, a user accesses a web server and sets his/her ID (identifier) and password, and then logs in the web server by inputting the set ID and password in a terminal. In addition, as an improvement of the existing password authentication, there has been proposed a technique for authenticating a user by using a touch pattern set by the user. Korean Unexamined Patent Publication No. 10-2009-0013432 discloses a portable terminal for authenticating a user by using a pattern and its locking and releasing method.

However if this method is used, the authentication information of the user, namely the password and ID of the user, may be captured by other persons by means of shoulder surfing. Further, if ID and password of a specific user are captured by others, person data of the user may be continuously exposed to others unless the specific user changes the ID and password or withdraw from member.

SUMMARY

The present technology is directed to providing a safe log-in system and method for protecting authentication information of a user against hacking from outside such as shoulder surfing and reinforcing security of the authentication information, and an apparatus for the same.

In one aspect of the present disclosure, there is provided a safe log-in method for allowing a safe log-in of a communication device which accesses a web site, which includes: by an authentication data providing device, determining whether the authentication data providing device and the communication device are located at the same place; by the authentication data providing device, acquiring authentication-related data of the communication device when the authentication data providing device and the communication device are located at the same place as a result of the determination; and by the authentication data providing device, providing the acquired authentication-related data to the communication device or the web site.

The acquiring of authentication-related data may include requesting a decryption key to the communication device and receiving the decryption key from the communication device; and extracting encrypted log-in authentication information, and decrypting the extracted log-in authentication information by using the decryption key, wherein said providing of the authentication-related data includes providing the decrypted log-in authentication information to the web site or the communication device.

The method may further include: by the authentication data providing device, checking an access token of the communication device, wherein said providing of the authentication-related data includes providing the access token to the web site together with the log-in authentication information.

In addition, the acquiring of authentication-related data may include extracting encrypted log-in authentication information, the providing of the authentication-related data may include providing the extracted encrypted log-in authentication information to the communication device, and the method may further include: by the communication device, decrypting the encrypted log-in authentication information received from the authentication data providing device by using a decryption key which is already stored; and by the communication device, performing an authentication for the web site by using the decrypted log-in authentication information.

In addition, the acquiring of authentication-related data may include extracting a decryption key, the providing of the authentication-related data may include providing the extracted decryption key to the communication device, and the method may further include: by the communication device, decrypting encrypted log-in authentication information, which is already stored, by using the decryption key, and by the communication device, performing an authentication for the web site by using the decrypted log-in authentication information.

In addition, the acquiring of authentication-related data may include extracting an authentication information storage address, the providing of the authentication-related data may include providing the extracted authentication information storage address to the communication device, and the method may further include: by the communication device, receiving authentication information stored in the authentication information storage address from an authentication information storage server, and by the communication device, performing an authentication for the web site by using the received authentication information. In this case, the method may further include: by the communication device, decrypting the authentication information storage address received from the authentication data providing device.

The method may further include: by the authentication data providing device, checking a security level of the web site, and the acquiring of authentication-related data may include: applying the checked security level when the authentication data providing device and the communication device are located at the same place as a result of the determination; and acquiring the authentication-related data based on the applied security level.

The acquiring of authentication-related data may include: applying a reinforced security level higher than the checked security level when the authentication data providing device and the communication device are not located at the same place as a result of the determination; and acquiring the authentication-related data based on the applied reinforced security level.

Further, the acquiring of authentication-related data may include acquiring reinforced authentication information when the applied security level is higher than a threshold level, and the providing of the authentication-related data may include providing the reinforced authentication information to the web site or the communication device.

In addition, the acquiring of authentication-related data may include acquiring the authentication-related data when a user performs user authentication successfully, in case the applied security level is higher than a threshold level.

Meanwhile, the acquiring of authentication-related data may include: outputting a notification window for requesting the communication device to allow log-in when the applied security level is a preset specific security level; and acquiring the authentication-related data when an approval signal is input through the notification window.

The method may further include: by the authentication data providing device, monitoring whether the authentication data providing device and the communication device are continuously located at the same place; and by the authentication data providing device, performing log-out of the communication device when the authentication data providing device and the communication device are not located at the same place as a result of the monitoring.

In addition, the method may further include: by the authentication data providing device, providing a safe log-in activation message to the communication device when it is determined that the authentication data providing device and the communication device are located at the same place as a result of the determination.

In a second aspect of the present disclosure, there is also provided an authentication data providing device, which includes at least one processor; a memory; and at least one program stored in the memory and configured to be executed by the at least one processor, wherein the program includes: a location checking module configured to determine whether a communication device registered at a safe log-in service is located at the same place as the authentication data providing device; an authentication data acquiring module configured to acquire authentication-related data of a web site accessed by the communication device when the location checking module determines that the communication device and the authentication data providing device are located at the same place; and an authentication data providing module configured to provide the acquired authentication-related data to the web site or the communication device.

In a third aspect of the present disclosure, there is also provided a safe log-in system, which includes a second communication device; a first communication device configured to determine whether the first communication device is located at the same place as the second communication device, and when the first communication device and the second communication device are located the same place, acquire authentication-related data of a web site accessed by the second communication device and provide the authentication-related data to the second communication device or a web server; and a web server configured to receive authentication-related data from the first communication device or the second communication device and perform log-in authentication of the second communication device.

In the present disclosure, since a first communication device and a second communication device are associated to provide log-in authentication information to a web server, it is possible to protect ID and password of a user against shoulder surfing and reinforce security of the authentication information of the user.

In addition, in the present disclosure, since a security level of log-in authentication information is reinforced based on location information of a plurality of communication device or the log-in authentication information is selectively provided to a web server, it is possible to further reinforce security of the authentication information of the user.

Further, in the present disclosure, since a decryption key is acquired from a specific device and then encrypted log-in authentication information is decrypted, even though the encrypted log-in authentication information is captured by others, the log-in authentication information is not able to be decrypted by others, and thus the authentication information of the user may be protected against hacking from outside.

Moreover, in the present disclosure, if a plurality of designated communication devices gets out of the same place after a successful log-in, the communication devices with successful log-in are compulsorily logged out, in order to prevent an illegal user from using a web service.

BRIEF DESCRIPTION OF THE DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
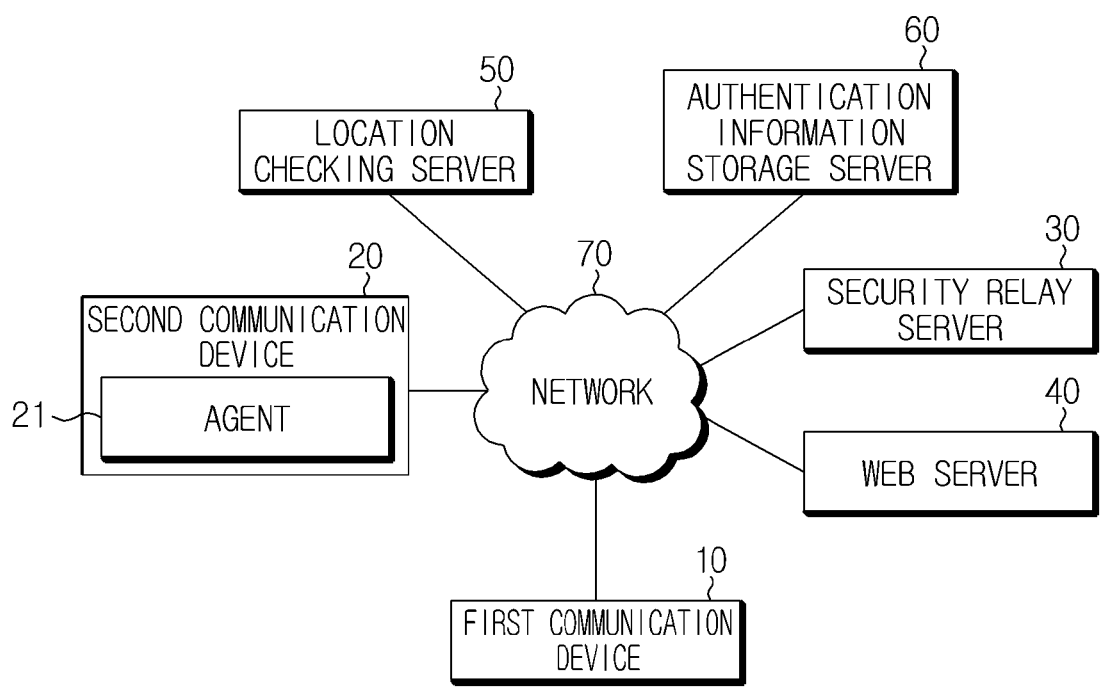
FIG. 1 is diagram showing a safe log-in system according to an embodiment of the present disclosure.

FIG. 1 is diagram showing a safe log-in system according to an embodiment of the present disclosure.

As shown in FIG. 1, the safe log-in system according to an embodiment of the present disclosure includes a first communication device 10, a second communication device 20, a security relay server 30, a web server 40, a location checking server 50 and an authentication information storage server 60.

The first communication device 10, the second communication device 20, the security relay server 30, the web server 40, the location checking server 50, and the authentication information storage server 60 communicate with each other through a network 70. Here, the network 70 includes a mobile communication network, a wired Internet network, a local wireless communication network or the like, and this is well known in the art and thus not described in detail here.

The web server 40 is a server for providing on-line service to users, for example a portal service, a financial service, an on-line shopping service, an electronic commerce service or the like, and the web server 40 stores ID and password of each user. In addition, the web server 40 may store reinforced authentication information such as on-time password (OTP), bio information or the like for each user. In particular, when the second communication device 20 attempts log-in, the web server 40 receives log-in authentication information (namely, ID and password) of the second communication device 20 from the first communication device 10 or the second communication device 20 and performs log-in authentication of the second communication device 20 based on the log-in authentication information. In addition, the web server 40 may receive reinforced authentication information from the first communication device 10 or the second communication device 20 and perform user authentication based on the reinforced authentication information.

The security relay server 30 stores a table in which at least one user identification information is mapped with identification information of the first communication device 10. At this time, the security relay server 30 may store any one of a phone number of the first communication device 10, an IP address, a MAC address, and identification information of a safe log-in application installed at the first communication device 10, as the identification information of the first communication device 10, and may also store safe log-in service ID, a resident registration number of a user, an Internet personal identification number (I-PIN), a mobile communication phone number or the like, as user identification information.

In particular, if the second communication device 20 starts browsing a web page, the security relay server 30 receives a service notification message containing user identification information from the second communication device 20, checks identification information of the first communication device 10, which is mapped with the user identification information, and then transmits the service notification message to the first communication device 10 having the identification information.

In addition, if receiving the log-in notification message from the second communication device 20, the security relay server 30 checks identification information of the first communication device 10, which is mapped with the user identification information of the second communication device 20, and transmits the log-in notification message to the first communication device 10 having identification information. The security relay server 30 may transmit the service notification message or the log-in notification message as a push message.

The location checking server 50 checks a place where the second communication device 20 or the first communication device 10 is located. In particular, the location checking server 50 stores location information which is mapped with identification information of a radio base station, and if identification information of the radio base station is received from the second communication device 20 or the first communication device 10, the location checking server 50 checks location information which is mapped with identification information of the radio base station and transmits the location information to the second communication device 20 or the first communication device 10.

The authentication information storage server 60 stores encrypted log-in authentication information of each site for each user. At this time, the authentication information storage server 60 designates a storage address of the log-in authentication information and stores encrypted log-in authentication information at the designated storage address, respectively. In addition, the authentication information storage server 60 may store reinforced authentication information of each user.

The second communication device 20 attempts log-in to the web server 40, and an agent 21 for safe log-in service is loaded therein. If the second communication device 20 starts browsing a web page, the agent 21 transmits a service notification message containing user identification information to the security relay server 30. The agent 21 checks may check location information of the second communication device 20 and include the location information in the service notification message. In addition, the agent 21 monitors whether the second communication device 20 performs log-in to a specific site, and if the second communication device 20 performs log-in to a specific site, the agent 21 generates a log-in notification message containing identification information of a web site to which log-in is attempted, identification information of a log-in user and identification information of the second communication device 20 and transmits the log-in notification message to the security relay server 30.

In addition, the agent 21 outputs a safe log-in menu displaying a nickname or ID of a safe log-in service in a web page (see FIG. 3), and if there is an input to the safe log-in menu, the agent 21 may generates a log-in notification message and transmits the log-in notification message to the security relay server 30. Selectively, if the second communication device 20 receives a web page having a log-in menu from the web server 40, the agent 21 may instantly generate a log-in notification message and transmit the log-in notification message to the security relay server 30. In addition, if receiving a safe log-in menu activation message from the first communication device 10, the agent 21 activates an inactivated safe log-in menu so that the user may recognize that the first communication device 10 and the second communication device 20 are located at the same place. At this time, the agent 21 may activate the safe log-in menu by changing a dark color of the safe log-in menu into a bright color, blinking the safe log-in menu, or outputting an activation graphic sign to the safe log-in menu.

In an embodiment, the agent 21 may store a decryption key and provide the decryption key to a designated first communication device 10. The agent 21 automatically generates and stores an inherent decryption key for a user. The decryption key stored in the second communication device 20 is used for decrypting log-in authentication information, which is classified according to security policies of a first level and a second level, described later.

In another embodiment, the agent 21 may receive encrypted authentication information from the first communication device 10, decrypt the authentication information by using a decryption key stored therein, and then perform log-in authentication to the web server 40 by using the decrypted authentication information.

In another embodiment, the agent 21 may store encrypted authentication information of each web site, receive a decryption key for decrypting the corresponding authentication information from the first communication device 10, decrypt the authentication information by using the decryption key, and provide the decrypted authentication information to the web server 40.

In addition, in another embodiment, the agent 21 may receive an authentication information storage address from the first communication device 10, and receive authentication information stored at the authentication information storage address from the authentication information storage server 60.

The second communication device 20 may employ any communication device capable of accessing the web server 40 via the network 70, without specific limitations, for example a desktop computer, a tablet computer, a notebook, a mobile communication terminal or the like. In addition, when a safe log-in application or plug-in is installed, the agent 21 may be loaded in the second communication device 20. Moreover, if a safe log-in script included in the web page is executed, the agent 21 may be loaded in the second communication device 20. Further, the agent 21 may also be implemented other scripts, web storages, or other programs or instructions such as cookies.

The first communication device 10 provides authentication-related data to the second communication device 20 or the web server 40. The authentication-related data includes at least one of a decryption key, log-in authentication information (namely, ID and password), reinforced authentication information, and an authentication information storage address. The first communication device 10 applies a security level based on the location information of the second communication device 20. For this, the first communication device 10 may store a security policy table in which web site identification information is mapped with a security level, and store location information of the second communication device 20.

In addition, if a service notification message notifying initiation of a safe log-in service of the second communication device 20 is received from the security relay server 30, the first communication device 10 compares its location information with the location information of the second communication device 20, and determines whether the first communication device 10 and the second communication device 20 are located at the same place. If it is determined that the first communication device 10 and the second communication device 20 are located at the same place, the first communication device 10 transmits the safe log-in activation message to the second communication device 20.

Further, if a log-in notification message is received from the security relay server 30, the first communication device 10 extracts web site identification information from the log-in notification message, and checks a security level corresponding to the web site identification information in the security policy table. In addition, based on the determination result, the first communication device 10 applies the checked security level intactly or applies a reinforced security level as a log-in security level of the user. Meanwhile, if it is determined that the first communication device 10 and the second communication device 20 are not located at the same place as a result of the determination, the first communication device 10 does not provide the authentication-related data to the web server 40 or the second communication device 20 but may transmit a message notifying to the second communication device 20 that log-in is not available.

In an embodiment, the first communication device 10 may classify and store security data recording log-in authentication information of each web site for identification information of each communication device. Also, after acquiring a decryption key from the second communication device 20, the first communication device 10 may decrypt log-in authentication information of the web site accessed by the second communication device 20 by using the decryption key and transmit the decrypted log-in authentication information to the web server 40 or the second communication device 20.

In another embodiment, the first communication device 10 may also classify and store security data recording log-in authentication information of each web site for identification information of each communication device, and transmit encrypted authentication information of a web site to be accessed by the second communication device 20 to the second communication device 20.

In another embodiment, the first communication device 10 may store a decryption key of each communication device, and transmit the decryption key used for decrypting the encrypted authentication information to the second communication device 20.

In another embodiment, the first communication device 10 may classify and store an authentication information storage address of each web site for identification information of each communication device. Also, the first communication device 10 may check a web site to be accessed by a user of the second communication device 20, and then provide the authentication information storage address storing authentication information of the web site to the second communication device 20.

Meanwhile, if the applied security level is higher than a threshold level, the first communication device 10 may transmit reinforced authentication information to the web server 40 or the second communication device 10.

The first communication device 10 is a tablet computer, a notebook, a mobile communication terminal, a server or the like, and preferably a smart phone.

Figure 2:
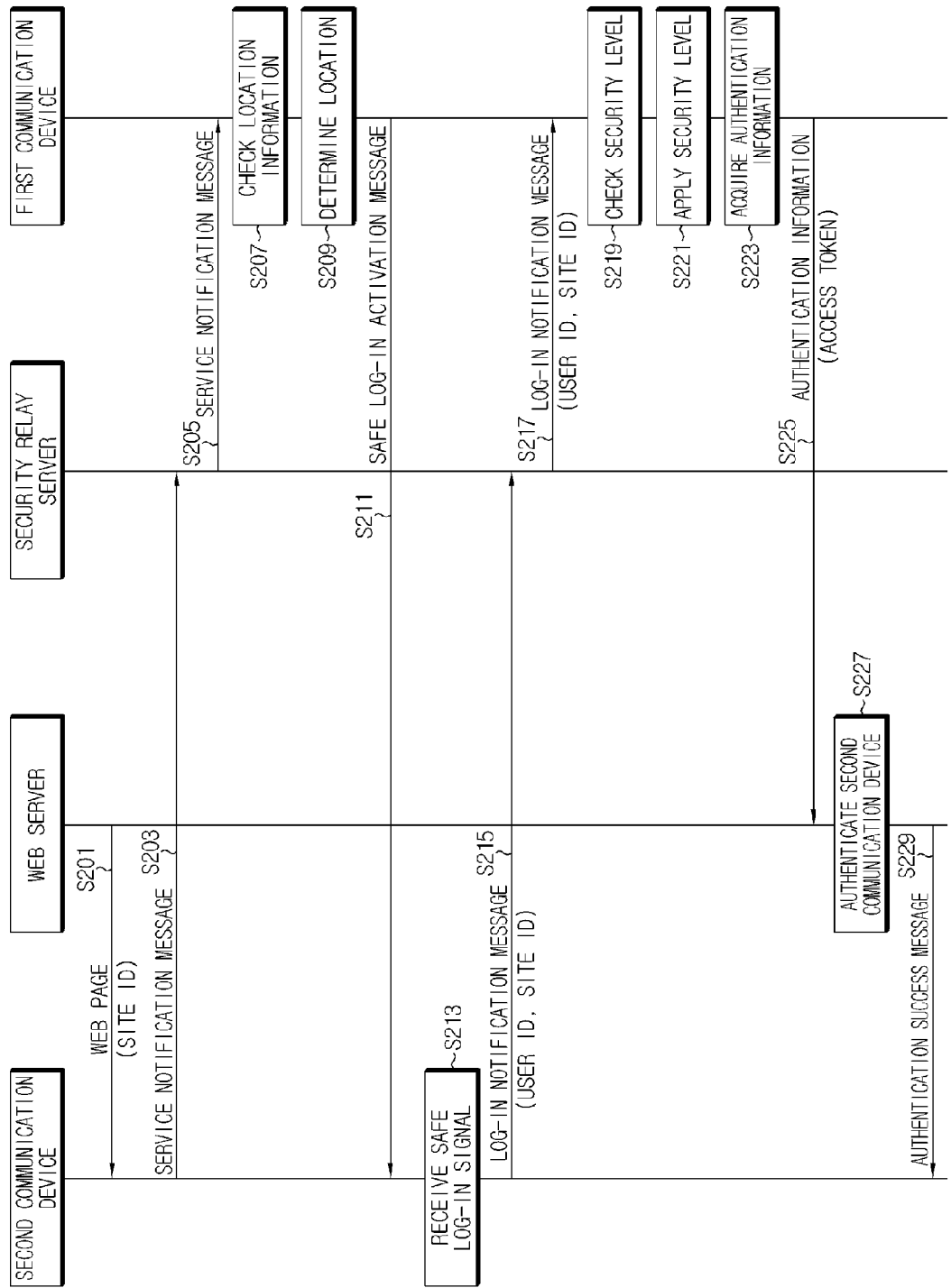
FIG. 2 is a flowchart for illustrating a method for log-in authentication in the safe log-in system according to an embodiment of the present disclosure.

FIG. 2 is a flowchart for illustrating a method for log-in authentication in the safe log-in system according to an embodiment of the present disclosure.

Referring to FIG. 2, the second communication device 20 accesses the web server 40 which is endowed with a web site address input by a user, and the web server 40 transmits a web page having a log-in menu, which allows an input of ID and password, to the second communication device 20 (S201). At this time, the web server 40 generates an access token, and transmits the access token and web site identification information (for example, a site address of the web server) to the second communication device 20 together with the web page. The access token is a kind of object in which security information required for performing log-in by the second communication device 20 is recorded, and has inherent identification information (for example, security identification information).

Next, the second communication device 20 outputs the web page received from the web server 40 on a screen. In addition, the agent 21 of the second communication device 20 outputs an inactivated safe log-in menu below the log-in menu of the web page. At this time, the agent 21 may inactivate the safe log-in menu by controlling the safe log-in menu to be displayed with a dark or translucent color on the web page. If a nickname or ID of the safe log-in service is stored in a storage area such as cookies, the agent 21 of the second communication device 20 may display the nickname or ID on the web page together with the safe log-in menu.

Figure 3:
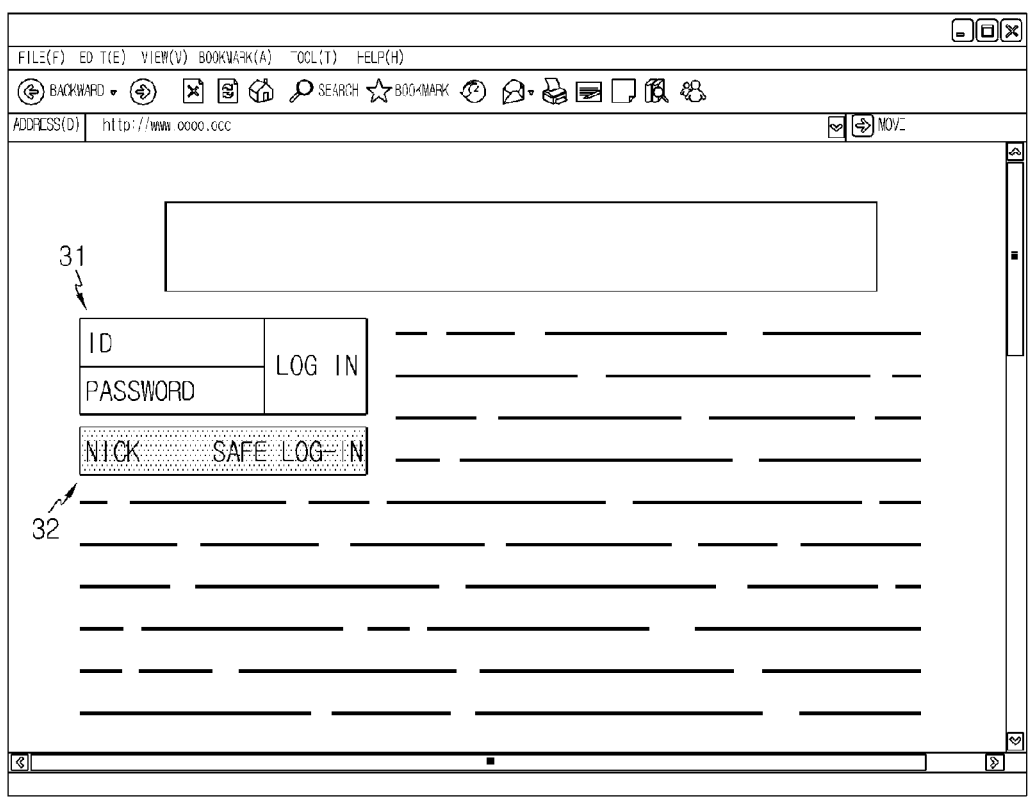
FIG. 3 is a diagram showing a web page displaying a safe log-in menu according to an embodiment of the present disclosure.

FIG. 3 is a diagram showing a web page displaying a safe log-in menu according to an embodiment of the present disclosure.

As shown in FIG. 3, the agent 21 may display a safe log-in menu 32 according to the present disclosure on the web page in addition to the log-in menu 31 basically provided in the web page. At this time, if there remains a record of utilization of the safe log-in service in cookies, the agent 21 may check ID or nickname of the user used in the safe log-in service from the cookies and display the ID or nickname of the user in a certain area of the safe log-in menu 32. FIG. 3 shows that 'Nick' is displayed in the web page as a nickname of the user for the safe log-in service together with the safe log-in menu 32, and the safe log-in menu 32 is displayed in a dark color (namely, in an inactivated state). Selectively, the agent 21 may include the safe log-in menu 32 in a menu tree of a web browser in a toolbar form.

Next, the agent 21 of the second communication device 20 checks that the second communication device 20 starts browsing a web page, notifies initiation of the safe log-in service, and transmits a service notification message containing user identification information of the second communication device 20 and identification information of the second communication device to the security relay server 30 (S203). At this time, the agent 21 may record any one of a safe log-in service ID, a resident registration number of the user, an Internet personal identification number (I-PIN), a mobile communication phone number or the like in the service notification message as user identification information. Further, the agent 21 may record any one of its identification information (namely, agent identification information), an IP (Internet Protocol) address of the second communication device 20, a MAC (Media Access Control) address or the like in the service notification message as identification information of the second communication device 20. In addition, the agent 21 may check location information of the second communication device 20 and include the location information in the service notification message. For example, the agent 21 may acquire a GPS (Global Positioning System) coordinate by using a GPS receiver loaded in the second communication device 20, and include the GPS coordinate or administration address information corresponding to the GPS coordinate in the service notification message as location information. In addition, if the second communication device 20 is a terminal in which a local wireless communication module (for example, a WiFi module) is loaded, the agent 21 may acquire identification information of a neighboring small radio base station (for example, an access point) accessible through the local wireless communication module, transmit identification information of the small radio base station to the location checking server 50, receive location information from the location checking server 50, and then include the location information in the service notification message. The agent checks whether the second communication device 20 is a terminal available for mobile communication or a stationary terminal, and if the second communication device 20 is a terminal available for mobile communication, the agent acquires location information and includes the location information in the service notification message.

If so, the security relay server 30 checks the user identification information contained in the service notification message, and checks identification information of the first communication device 10 which is mapped with the user identification information. In addition, the security relay server 30 transmits the service notification message to the first communication device 10 having the checked identification information (S205).

Subsequently, the first communication device 10 checks location information of the second communication device 20 accessing the web server 40, and also checks location information of the first communication device 10 (S207). At this time, the first communication device 10 may extract identification information of the second communication device from the service notification message, and check location information of the second communication device 20 from the data storing location information mapped with the identification information. In addition, if the service notification message contains location information of the second communication device 20, the first communication device 10 may check location information of the second communication device 20 by extracting the location information from the service notification message. Further, the first communication device 10 may acquire a GPS coordinate by using a GPS receiver loaded therein, and check its location based on the GPS coordinate. In addition, the first communication device 10 may recognize a small radio base station (for example, an access point) available for wireless communication by means of local wireless communication, transmit identification information of the small radio base station to the location checking server 50, and receive location information from the location checking server 50, thereby checking location information of the first communication device 10.

Next, the first communication device 10 compares its location information with location information of the second communication device 20 to determine whether the first communication device 10 and the second communication device 20 are located at the same place (S209). At this time, the first communication device 10 may determine whether the first communication device 10 and the second communication device 20 are located at the same place by checking whether the first communication device 10 and the second communication device 20 are located within the same administrative district or whether a distance between the first communication device 10 and the second communication device 20 is smaller than a threshold distance (for example, 100 m). Further, if the second communication device 20 and the first communication device 10 access small radio base stations, respectively, the second communication device 20 may determine whether the first communication device 10 and the second communication device 20 are located at the same place by checking whether the first communication device 10 and the second communication device 20 access the same small radio base station.

If it is determined that the first communication device 10 and the second communication device 20 are located at the same place, the first communication device 10 transmits a safe log-in activation message to the second communication device 20 (S211). At this time, the first communication device 10 recognizes the second communication device 20 based on identification information of the second communication device contained in the service notification message, and transmits the safe log-in activation message to the second communication device 20.

If so, the agent 21 of the second communication device 20 activates the inactivated safe log-in menu so that the user recognizes that the first communication device 10 and the second communication device 20 are located at the same place. At this time, the agent 21 may activate the safe log-in menu by changing a dark color of the safe log-in menu into a bright color, blinking the safe log-in menu, or outputting an activation graphic sign to the safe log-in menu.

Next, the agent 21 of the second communication device 20 monitors whether the safe log-in menu is clicked, and if the safe log-in menu is clicked, the agent 21 of the second communication device 20 generates a log-in notification message containing identification information of a web site to be logged in, an access token for accessing the web server 40, user identification information and identification information of the second communication device 20, and generates the log-in notification message to the security relay server 30 (S213, S215).

Then, the security relay server 30 checks the user identification information contained in the log-in notification message, and checks identification information of the first communication device 10 which is mapped with the user identification information. In addition, the security relay server 30 transmits the log-in notification message to the first communication device 10 having the checked identification information (S217).

Next, the first communication device 10 extracts the user identification information, the web site identification information, the access token and the identification information of the second communication device 20 from the log-in notification message received from the security relay server 30. Subsequently, the first communication device 10 checks a security level mapped with the extracted web site identification information from the security policy table (S219).

Next, the first communication device 10 checks the determination result performed in Step S209, and applies the checked security level or a reinforced security level based on the determination result (S221). In other words, if it is determined that the first communication device 10 and the second communication device 20 are located at the same place, the first communication device 10 applies the checked security level intactly. Meanwhile, if it is checked that the first communication device 10 and the second communication device 20 are not located in the same place, the first communication device 10 does not apply the checked security level intactly but applies a reinforced security level higher than the checked security level. At this time, if the security level checked in Step S219 is a highest level (namely, a third level), the first communication device 10 may apply the security level, namely the third level, intactly.

Subsequently, the first communication device 10 acquires log-in authentication information (namely, ID and password), which is one of authentication-related data, based on the applied security level (S223). In detail, if the security level is a first level which is a lowest level, the first communication device 10 obtains a decryption key used in the security level by requesting the decryption key to second communication device 20 and receiving the decryption key therefrom. In addition, the first communication device 10 checks security data dedicated to the second communication device among the security data classified for each communication device based on the identification information of the second communication device, and extracts encrypted log-in authentication information (namely, ID and password) mapped with the web site identification information from log-in authentication information included in the checked security data. Subsequently, the first communication device 10 decrypts the extracted log-in authentication information by using the decryption key, thereby acquiring the log-in authentication information.

In addition, if the security level is a second level, the first communication device 10 notifies that the second communication device 20 attempts log-in to a web site, and outputs a notification window to inquire whether or not to approve the log-in. Here, only when an approval signal is input by the user through the notification window, the first communication device 10 requests a decryption key to the second communication device 20 and receives the decryption key therefrom, and then extracts and decrypts encrypted log-in authentication information mapped with the web site identification information from the security data dedicated to the second communication device by using the decryption key.

Meanwhile, if the security level is a third level which is a highest level, the first communication device 10 acquires authentication information by receiving reinforced authentication information such as bio information (for example, fingerprint information, iris information or the like) or OTP from the user. At this time, similar to the case where the security level is a first level, the first communication device 10 acquires a decryption key from the second communication device 20, decrypts the log-in authentication information of the web site by using the decryption key, and acquires all of the decrypted log-in authentication information and the reinforced log-in authentication information received from the user.

In other case, if the security level is a third level, the first communication device 10 may output an input window for inputting its authentication information, and receive user authentication information such as a password, bio information (for example, fingerprint information, iris information or the like), a resident registration number or the like from the user through the input window. In this case, if the user authentication information input by the user is identical to user authentication information stored therein, the first communication device 10 may decrypt log-in authentication information of the web site by receiving reinforced authentication information from the user or receiving a decryption key from the second communication device 20, or may receive reinforced authentication information and also decrypts the log-in authentication information. In other words, if the security level is a third level, the first communication device 10 performs user authentication, and if the user authentication is successful, the first communication device 10 acquires authentication-related data.

Next, the first communication device 10 checks the web site identification information and the access token extracted from the log-in notification message, and transmits at least one of the acquired log-in authentication information and the reinforced authentication information to the web server 40 endowed with the web site identification information (S225). At this time, the first communication device 10 transmits the access token to the web server 40 together with the corresponding authentication information.

Then, the web server 40 recognizes the second communication device 20 attempting log-in, based on the access token received from the first communication device 10, and checks whether the authentication information is accurate, thereby performing log-in authentication of the second communication device 20 (S227). At this time, if ID and password are recorded in the authentication information, the web server 40 performs log-in authentication of the second communication device 20 by checking whether the ID and password are accurate. In addition, if reinforced authentication information such as bio information of the user, OTP (One Time Password) or the like is included in the authentication information, the web server 40 additionally performs log-in authentication of the second communication device 20 by checking whether the authentication information is identical to reinforced authentication information of the user which is already stored therein. In other words, in case of receiving the log-in authentication information and the reinforced authentication information from the first communication device 10, the web server 40 primarily authenticates the user of the second communication device 20 based on the ID and password contained in the log-in authentication information, and secondarily authenticates the user of the second communication device 20 based on the reinforced authentication information.

Next, if the log-in authentication is failed, the web server 40 treats that the log-in of the second communication device 20 is failed, but if the log-in authentication is successful, the web server 40 transmits an authentication success message to the second communication device 20 (S229), and then provides an on-line service requested by the second communication device 20. If the log-in authentication is successful, web server 40 notifies to the first communication device 10 that the second communication device 20 performs log-in successfully.

Meanwhile, if the security level is applied as a third level, the first communication device 10 may transmit only the reinforced authentication information to the web server 40, without transmitting the log-in authentication information. In this case, the web server 40 authenticates the second communication device 20 based on the reinforced authentication information.

In addition, the first communication device 10 may transmit at least one of the decrypted log-in authentication information and the reinforced authentication information to the second communication device 20. In this case, the second communication device 20 performs log-in authentication by transmitting the authentication information received from the first communication device 10 to the web server 40.

Hereinafter, in the description with reference to FIGS. 4 to 6, each step (S201 to S221) indicated by the same reference symbol as in FIG. 2 is substantially identical to that of FIG. 2 and thus is not described in detail here.

Figure 4:
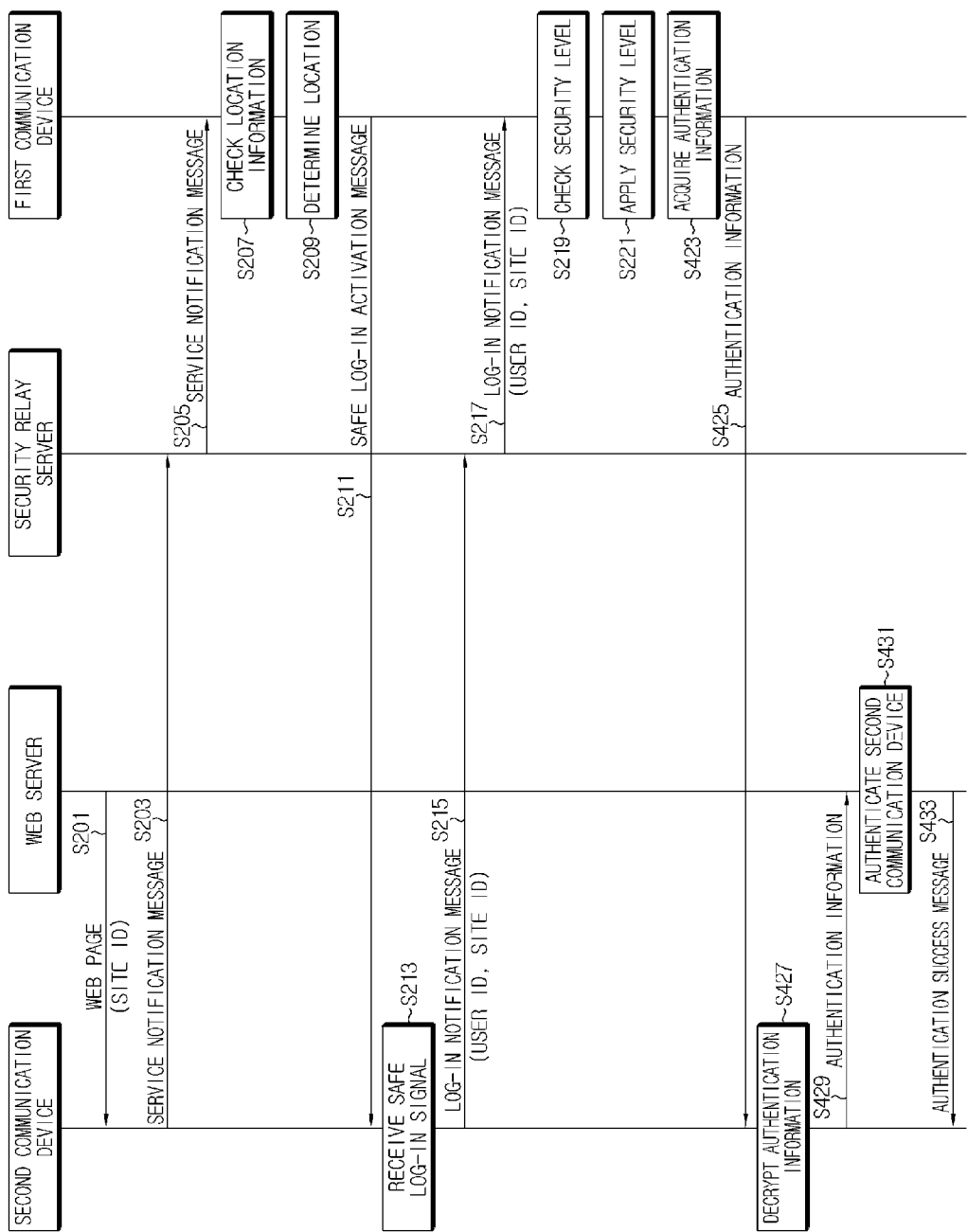
FIG. 4 is a flowchart for illustrating a method for log-in authentication in a safe log-in system according to another embodiment of the present disclosure.

FIG. 4 is a flowchart for illustrating a method for log-in authentication in a safe log-in system according to another embodiment of the present disclosure.

Referring to FIG. 4, the first communication device 10 applies a security level, and then acquires log-in authentication information of the user based on the security level (S423). In detail, if the security level is a first level which is a lowest level, the first communication device 10 checks security data dedicated to the second communication device from the security data classified for each communication device based on identification information of the second communication device, and extracts encrypted log-in authentication information mapped with the web site identification information from the log-in authentication information contained in the checked security data. In addition, if the security level is a second level, the first communication device 10 notifies that the second communication device 20 attempts log-in to the web site, and outputs a notification window to inquire whether or not to approve the log-in. Here, only when an approval signal is input by the user through the notification window, the first communication device 10 extracts encrypted log-in authentication information mapped with the web site from the security data dedicated to the second communication device.

Meanwhile, if the security level is a third level which is a highest level, the first communication device 10 receives reinforced log-in authentication information such as bio information, OTP or the like from the user, thereby acquiring reinforced authentication information. At this time, similar to the case where the security level is a first level, the first communication device 10 may additionally extract encrypted log-in authentication information mapped with the web site from the security data dedicated to the second communication device.

In other case, if the security level is a third level, the first communication device 10 may output an input window for inputting user authentication information, and receive user authentication information such as a password, bio information (for example, fingerprint information, iris information or the like), a resident registration number or the like from the user through the input window. In addition, if the user authentication information input by the user is identical to user authentication information stored therein, the first communication device 10 may receive reinforced authentication information input by the user or extract encrypted log-in authentication information, or acquire both of them (namely, the reinforced authentication information and the encrypted log-in authentication information). In other words, if the security level is a third level, the first communication device 10 performs user authentication, and if the user authentication is successful, the first communication device 10 acquires authentication-related data.

Next, the first communication device 10 transmits at least one of the acquired encrypted log-in authentication information and the reinforced authentication information to the second communication device 20 (S425). The first communication device 10 encrypts the reinforced authentication information by using a predetermined encryption key and transmits the encrypted reinforced authentication information to the second communication device 20 so that the encrypted reinforced authentication information may be normally decrypted using a decryption key stored in the second communication device 20.

Then, the second communication device 20 decrypts the encrypted log-in authentication information received from the first communication device 10 by using a decryption key stored therein (S427), and transmits the decrypted log-in authentication information to the web server 40 to request log-in authentication (S429). At this time, in case of receiving reinforced authentication information from the first communication device 10, the second communication device 20 decrypts the reinforced authentication information by using a decryption key stored therein, and additionally transmits the decrypted reinforced authentication information to the web server 40.

Next, the web server 40 performs log-in authentication of the second communication device 20 by checking whether the authentication information received from the second communication device 20 is accurate (S431). At this time, if ID and password are recorded in the authentication information, the web server 40 checks whether the ID and password are accurate to perform log-in authentication of the second communication device 20. In addition, if reinforced authentication information such as bio information, OTP or the like is included in the authentication information, the web server 40 may additionally perform log-in authentication of the second communication device 20 by checking whether the authentication information is identical to the reinforced authentication information of the user which is already stored therein.

Next, if the log-in authentication is failed, the web server 40 treats that the log-in of the second communication device 20 is failed, but if the log-in authentication is successful, the web server 40 transmits an authentication success message to the second communication device 20 (S433), and then provides an on-line service requested by the second communication device 20.

Meanwhile, if the security level is applied as a third level, the first communication device 10 may transmit only the reinforced authentication information to the second communication device 20, without transmitting the log-in authentication information. In this case, the second communication device 20 decrypts the reinforced authentication information, and transmits the reinforced authentication information to the web server 40 instead of the log-in authentication information to perform authentication for the web service.

Figure 5:
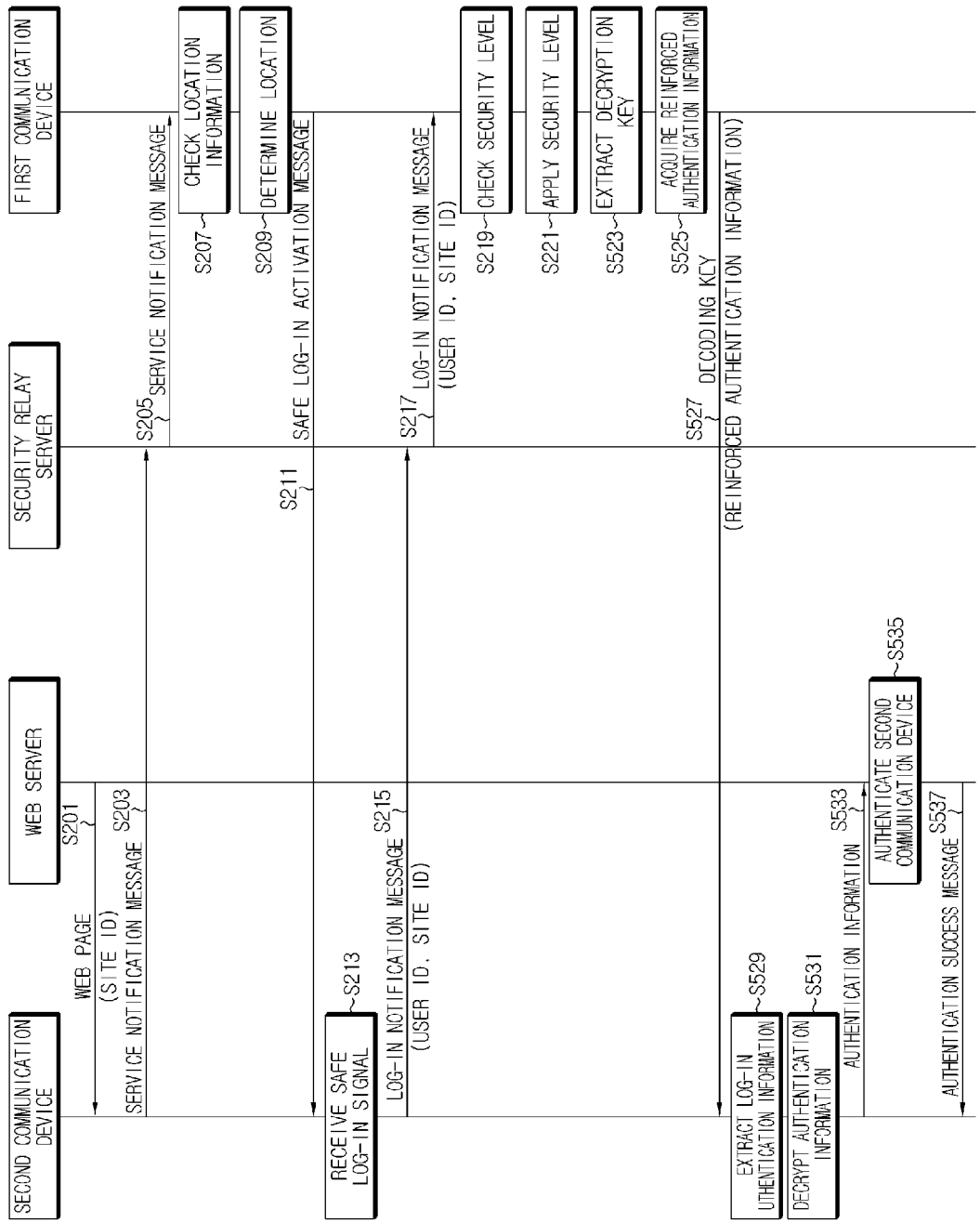
FIG. 5 is a flowchart for illustrating a method for log-in authentication in a safe log-in system according to another embodiment of the present disclosure.

FIG. 5 is a flowchart for illustrating a method for log-in authentication in a safe log-in system according to another embodiment of the present disclosure.

In the embodiment depicted in FIG. 5, the first communication device 10 stores a decryption key classified for each communication device, and the second communication device 20 stores encrypted log-in authentication information of each web site.

Referring to FIG. 5, if a security level is applied, the first communication device 10 performs a process of extracting a decryption key which is one of authentication-related data, based on the applied security level (S523). In detail, if the security level is a first level which is a lowest level, the first communication device 10 extracts a decryption key corresponding to the identification information of the second communication device contained in the log-in notification message, from decryption keys classified for each user. In addition, if the security level is a second level, the first communication device 10 notifies that the second communication device 20 attempts log-in to the web site, and outputs a notification window to inquire whether or not to approve the log-in. Here, only when an approval signal is input by the user through the notification window, the first communication device 10 extracts a decryption key corresponding to the identification information of the second communication device.

Meanwhile, if the security level is a third level which is a highest level, the first communication device 10 extracts a decryption key corresponding to the identification information of the second communication device, and receives reinforced authentication information such as bio information, OTP or the like from the user, thereby acquiring reinforced authentication information (S525). In other case, if the security level is a third level, the first communication device 10 outputs an input window for inputting user authentication information, and receives user authentication information of the user through the input window from the user. Here, after authenticating whether the user authentication information is accurate, the first communication device 10 may selectively obtain authentication-related data. In other words, if the security level is a third level, the first communication device 10 authenticates whether the user authentication information input by the user is accurate, and then if the authentication is successful, the first communication device 10 may receive reinforced authentication information from the user or extracting a decryption key, or acquire both of them (namely, the reinforced authentication information and the decryption key). In the description with reference to FIG. 5, it is explained that the first communication device 10 applies a third level as the security level and additionally acquires reinforced authentication information.

Next, the first communication device 10 transmits the extracted decryption key and the reinforced authentication information to the second communication device 20 (S527). The first communication device 10 encrypts the reinforced authentication information by using a predetermined encryption key and transmits the encrypted reinforced authentication information to the second communication device 20 so that the reinforced authentication information may be normally decrypted using a decryption key stored in the second communication device 20.

Subsequently, the second communication device 20 extracts encrypted log-in authentication information mapped with identification information of a web site currently accessed, from encrypted log-in authentication information of each site stored therein (S529). Subsequently, the second communication device 20 decrypts the extracted log-in authentication information by using the decryption key received from the first communication device 10 (S531). Moreover, the second communication device 20 decrypts the reinforced authentication information received from the first communication device 10 by using a decryption key stored therein.

Next, the second communication device 20 transmits the decrypted log-in authentication information and the reinforced authentication information to the web server 40 to request log-in authentication (S533).

Then, the web server 40 performs log-in authentication of the second communication device 20 by checking whether both of the log-in authentication information and the reinforced authentication information received from the second communication device 20 are accurate (S535). Next, if the log-in authentication is failed, the web server 40 treats that the log-in of the second communication device 20 is failed, but if the log-in authentication is successful, the web server 40 transmits an authentication success message to the second communication device 20 (S537), and then provides an on-line service requested by the second communication device 20.

Meanwhile, if the security level is applied as a first level or a third level, the first communication device 10 may transmit only the decryption key to the second communication device 20, without transmitting the reinforced authentication information, and the second communication device 20 decrypts the log-in authentication information extracted in Step S529 by using the decryption key and transmits the decrypted log-in authentication information to the web server 40. In other words, if the security level is applied as a first level or a second level in the first communication device 10, the second communication device 20 transmits only the log-in authentication information to the web server 40, without transmitting the reinforced authentication information, and the web server 40 performs log-in authentication of the second communication device 20 based on the log-in authentication information.

In addition, if the security level is applied as a third level, the first communication device 10 may transmit only the reinforced authentication information to the second communication device 20. In this case, the second communication device 20 decrypts the reinforced authentication information and transmits the reinforced authentication information to the web server 40 instead of the log-in authentication information. If so, the web server 40 performs log-in authentication of the second communication device 20, based on the reinforced authentication information.

Figure 6:
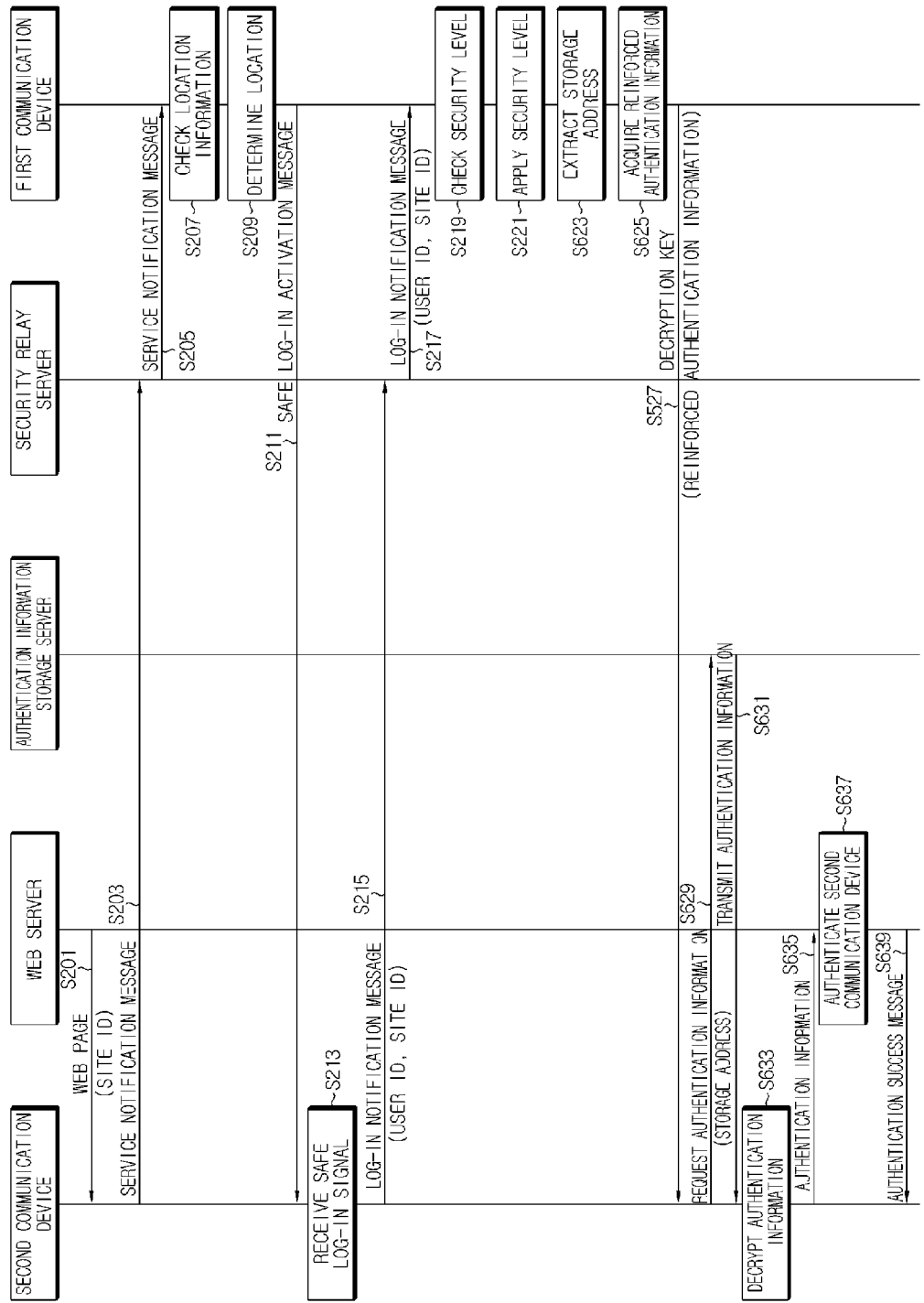
FIG. 6 is a flowchart for illustrating a method for log-in authentication in a safe log-in system according to another embodiment of the present disclosure.

FIG. 6 is a flowchart for illustrating a method for log-in authentication in a safe log-in system according to another embodiment of the present disclosure.

In the embodiment depicted in FIG. 6, the first communication device 10 classifies and stores an encrypted authentication information storage address of each web site for identification information of each communication device.

Referring to FIG. 6, if a security level is applied, the first communication device 10 performs a process of extracting an authentication information storage address, which is one of authentication-related data, based on the applied security level (S623). In detail, if the security level is a first level which is a lowest level, the first communication device 10 checks storage address data dedicated to the second communication device attempting log-in based on the identification information of the second communication device included in the log-in notification message, and extracts an encrypted authentication information storage address mapped with the site identification information contained in the log-in notification message among the storage address data. In addition, if the security level is a second level, the first communication device 10 notifies that the second communication device 20 attempts log-in to a web site, and outputs a notification window to inquire whether or not to approve the log-in. Here, only when an approval signal is input by the user through the notification window, the first communication device 10 extracts an encrypted authentication information storage address mapped with the web site identification information from the storage address data dedicated to the second communication device.

Meanwhile, if the security level is a third level which is a highest level, the first communication device 10 extracts an encrypted authentication information storage address mapped with the site identification information from the storage address data dedicated to the second communication device, and receives reinforced log-in authentication information such as bio information, OTP or the like from the user, thereby acquiring reinforced authentication information (S625).

In other case, if the security level is a third level, the first communication device 10 may output an input window for inputting user authentication information, and receive user authentication information from the user through the input window. Also, after authenticating that the user authentication information is accurate, the first communication device 10 may selectively receive authentication-related data. In other words, if the security level is a third level, the first communication device 10 authenticates whether the user authentication information is accurate, and if the authentication is successful, the first communication device 10 may receive reinforced authentication information from the user or extract authentication information storage address, or acquire both of them (namely, the reinforced authentication information and the authentication information storage address). In FIG. 6, it is illustrated that the first communication device 10 applies a third level as the security level and additionally acquires reinforced authentication information.

Next, the first communication device 10 transmits the extracted encrypted authentication information storage address and the reinforced authentication information to the second communication device 20 (S627). At this time, the first communication device 10 may encrypt the reinforced authentication information by using a predetermined encryption key and transmit the encrypted reinforced authentication information to the second communication device 20 so that the encrypted reinforced authentication information may be normally decrypted by a decryption key stored in the second communication device 20.

Subsequently, the second communication device 20 decrypts the encrypted authentication information storage address by using a decryption key stored therein. In addition, the second communication device 20 transmits the authentication information request message containing the storage address to the authentication information storage server 60 (S629).

If so, the authentication information storage server 60 checks the authentication information storage address in the authentication information request message, extracts encrypted authentication information stored at the storage address, and transmits the encrypted authentication information to the second communication device 20 (S631).

Subsequently, the second communication device 20 decrypts the encrypted authentication information by using a decryption key stored therein, and also decrypts the reinforced authentication information received from the first communication device 10 (S633). Next, the second communication device 20 transmits the decrypted log-in authentication information and the reinforced authentication information to the web server 40 to request log-in authentication (S635).

If so, the web server 40 performs log-in authentication of the second communication device 20 by checking whether both of the log-in authentication information and the reinforced authentication information received from the second communication device 20 are accurate (S637). Next, if the log-in authentication is failed, the web server 40 treats that the log-in of the second communication device 20 is failed, but if the log-in authentication is successful, the web server 40 transmits an authentication success message to the second communication device 20 (S639), and then provides an on-line service requested by the second communication device 20.

Meanwhile, if the security level is applied as a first level or a second level, the first communication device 10 transmits only the authentication information storage address to the second communication device 20, and the second communication device 20 performs log-in authentication to the web server 40 by receiving log-in authentication information from the authentication information storage server 60 based on the authentication information storage address and decrypting the log-in authentication information. In other words, if the security level is applied as a first level or a second level, the second communication device 20 performs log-in authentication by using only the log-in authentication information, without using the reinforced authentication information.

In addition, if the security level is applied as a third level, the first communication device 10 may transmit only the reinforced authentication information to the second communication device 20. In this case, the second communication device 20 decrypts the reinforced authentication information and transmits the reinforced authentication information to the web server 40 instead of the log-in authentication information. If so, the web server 40 performs log-in authentication of the second communication device 20, based on the reinforced authentication information.

In another embodiment, if the security level is applied as a third level, the first communication device 10 may extract a storage address of the reinforced authentication information and transmits the storage address to the second communication device 20. In this case, the second communication device 20 transmits an authentication information request message recording the storage address of the reinforced authentication information to the authentication information storage server 60, and the authentication information storage server 60 extracts the reinforced authentication information recording the storage address and transmits the reinforced authentication information to the second communication device 20. In addition, the second communication device 20 decrypts the received reinforced authentication information and then performs log-in authentication to the web server 40.

Meanwhile, in the above embodiments, if it is determined that the first communication device 10 and the second communication device 20 are not located at the same place, the first communication device 10 may not provide any data in relation to authentication (for example, log-in authentication information, a decryption key, an authentication information storage address, reinforced authentication information or the like) to the web server 40 or the first communication device 10 and provide a message notifying that log-in to the second communication device 20 is not available. In detail, if it is determined that the first communication device 10 and the second communication device 20 are located at the same place, the first communication device 10 checks site identification information contained in the safe log-in notification message and applies a security level mapped with the site identification information intactly. In addition, the first communication device 10 performs a process of acquiring authentication-related data according to the applied security level, and provides the acquired authentication-related data (namely, the log-in authentication information, the decryption key, the authentication information storage address, and the reinforced authentication information) to the second communication device 20 or the web server 40. Meanwhile, if it is determined that the first communication device 10 and the second communication device 20 are not located at the same place, the first communication device 10 does not provide authentication-related data but transmits a message notifying that log-in to the second communication device 20 is not available.

Figure 7:
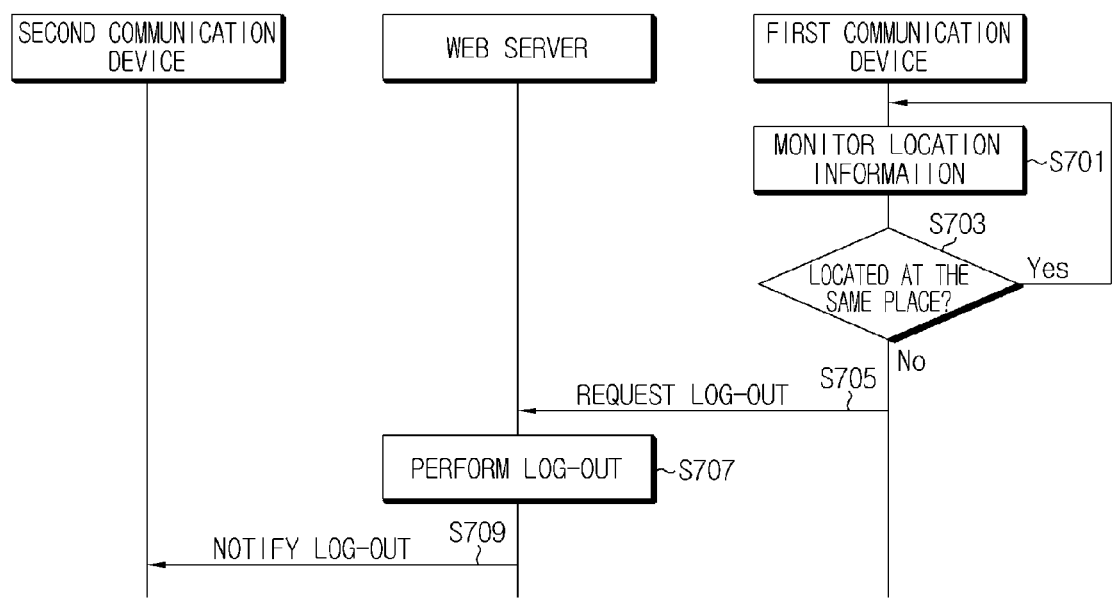
FIG. 7 is a flowchart for illustrating a method for compulsory log-out of a communication device which has logged in the safe log-in system according to an embodiment of the present disclosure.

FIG. 7 is a flowchart for illustrating a method for compulsory log-out of a communication device which has logged in the safe log-in system according to an embodiment of the present disclosure.

Referring to FIG. 7, if the second communication device 20 successfully performs log-in to the web site, the first communication device 10 continuously monitors its location information (S701). In other words, if a log-in success of the second communication device 20 is notified from the web server 40, the first communication device 10 continuously monitors its location information. If the second communication device 20 is a communication terminal allowing mobile communication, the first communication device 10 may continuously receive the location information from the second communication device 20 and monitor the location information of the second communication device 20.

Next, the first communication device 10 determines based on the monitored location information whether the first communication device 10 and the second communication device 20 are located at the same place (S703), and then if it is determined that the first communication device 10 and the second communication device 20 are located at the same place, the first communication device 10 executes Step S701 again. At this time, the first communication device 10 may determine whether the first communication device 10 and the second communication device 20 are located at the same place by checking whether the first communication device 10 and the second communication device 20 are located with the same administrative district or whether a distance between the first communication device 10 and the second communication device 20 is smaller than a threshold distance (for example, 100 m).

Meanwhile, if it is determined as a result of the determination of Step S703 that the first communication device 10 and the second communication device 20 are not located at the same place, the first communication device 10 transmits a log-out request message to the web server 40 (S705). At this time, the first communication device 10 includes an access token extracted from the log-in notification message into the log-out request message.

If so, the web server 40 identifies the second communication device 20 whose log-in is successful based on the access token contained in the log-out request message, and performs compulsory log-out of the second communication device 20 (S707). Subsequently, the web server 40 transmits a message notifying the log-out to the second communication device 20 (S709), and also notifies to the first communication device 10 that the second communication device 20 logs out.

Figure 8:
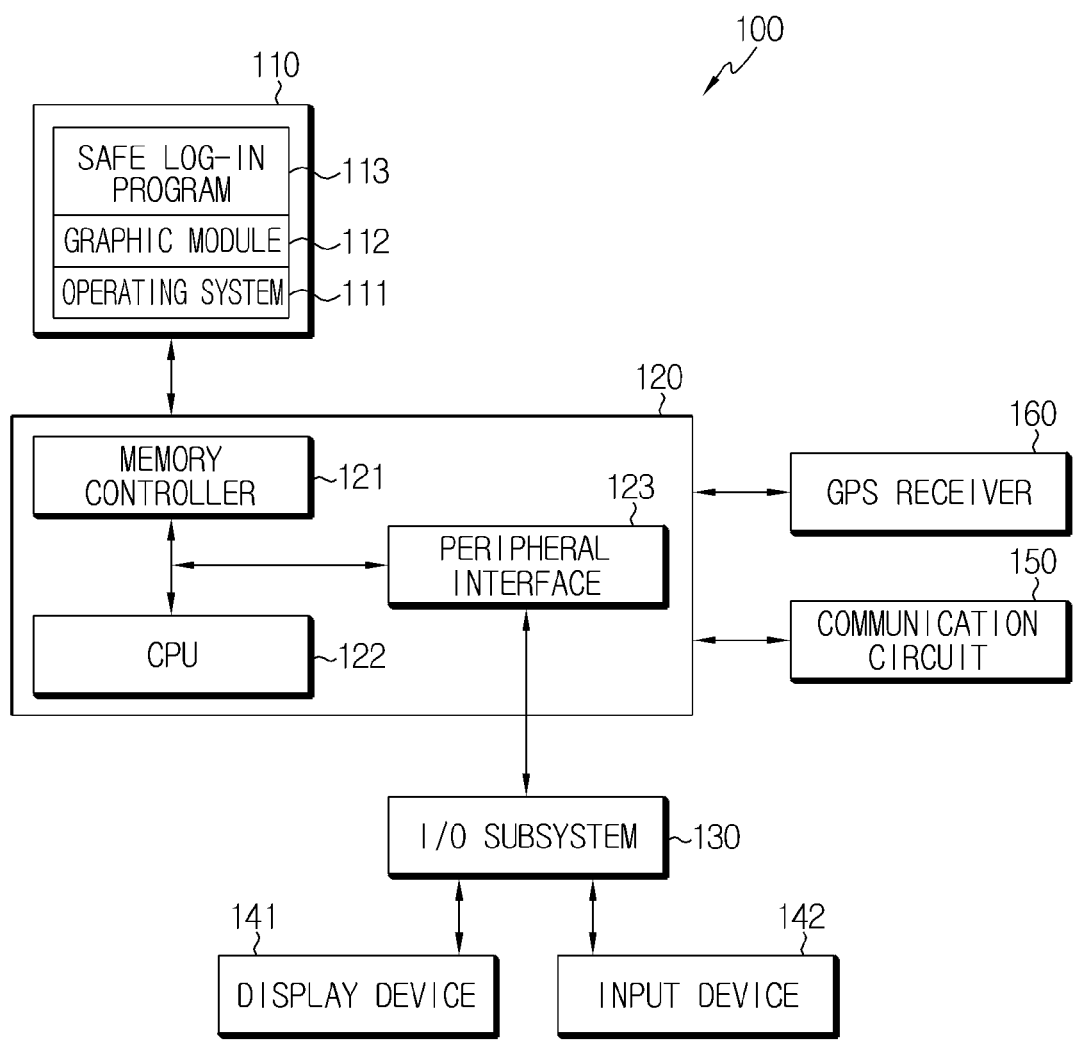
FIG. 8 is a diagram showing an authentication data providing device according to an embodiment of the present disclosure.

FIG. 8 is a diagram showing an authentication data providing device according to an embodiment of the present disclosure.

The authentication data providing device 100 depicted in FIG. 8 performs operations of the first communication device 10 illustrated in FIGS. 1 to 7.

As shown in FIG. 8, the authentication data providing device 100 according to an embodiment of the present disclosure includes a memory 110, a memory controller 121, at least one processor (CPU) 122, a peripheral interface 123, an input/output (I/O) subsystem 130, a display device 141, an input device 142, a communication circuit 150 and a GPS receiver 160. These components communicate through at least one communication bus or signal line. Various components depicted in FIG. 8 may be implemented as hardware, software, combination of hardware and software, including at least one signal processing and/or application specific integrated circuit.

The memory 110 may include a high-speed random access memory and may also include at least one magnetic disc storage device, a non-volatile memory such as a flash memory, or another non-volatile semiconductor memory device. In some embodiments, the memory 110 may further include a storage located far from at least one processor 122, for example, a network-attached storage device accessed to the communication circuit 150 through a communication network selected from the group consisting of Internet, intranet, LAN (Local Area Network), WLAN (Wide LAN), SAN (Storage Area Network) or combinations thereof. An access to the memory 110 by other components of the authentication data providing device 100 such as the processor 122 and the peripheral interface 123 may be controlled by the memory controller 121.

The peripheral interface 123 connects an input/output peripheral device to the processor 122 and the memory 110. At least one processor 122 executes various software programs and/or a set of instructions stored in the memory 110 to perform various functions for the authentication data providing device 100 and process data.

In some embodiment, the peripheral interface 123, the processor 122 and the memory controller 121 may be implemented on a single chip such as a chip 120. In some other embodiments, they may be implemented as individual chips.

The I/O subsystem 130 gives an interface between the peripheral interface 123 and peripheral input/output devices of the authentication data providing device 100 such as the display device 141 and the input device 142.

The display device 141 may use a liquid crystal display (LCD) or a light emitting polymer display (LPD), and this display device 141 may be a capacity-type, resistance-type or infrared-type touch display. The touch display gives an output interface and an input interface between a device and a user. The touch display displays a visual output to the user. The visual output may include texts, graphics, videos and their combinations. The visual output may partially or entirely correspond to a user interface target. The touch display forms a touch sensing surface for receiving a user input.

The input device 142 is an input means such as a keypad, a keyboard or the like and receives an input signal of the user.

The processor 122 is configured to perform operations and instructions associated with the authentication data providing device 100. For example, the processor 122 may control receipt and manipulation of input and output data between components of the authentication data providing device 100 by using instructions searched from the memory 110.

The communication circuit 150 transmits or receives wireless electronic waves through an antenna or transmits or receives data through a cable. The communication circuit 150 converts an electric signal into an electronic wave, or vice versa, and may communicate with a communication network, another mobile gateway or a communication device by means of the electronic wave. The communication circuit 150 includes, for example, an antenna system, an RF (Radio Frequency) transceiver, at least one amplifier, a tuner, at least one oscillator, a digital signal processor, a CODEC (Compression Decompression) chipset, a subscriber identity module (SIM) card, a memory or the like, but may also include any known circuit for performing such functions, without being limited to the above. The communication circuit 150 may communicate with other devices by means of Internet which is called World Wide Web (WWW), internet, and/or mobile communication networks, wireless LAN, MAN (metropolitan area network) and/or local wireless communication. The wireless communication includes GSM (Global System for Mobile Communication), EDGE (Enhanced Data GSM Environment), WCDMA (wideband code division multiple access), CDMA (code division multiple access), TDMA (time division multiple access), VoIP (voice over Internet Protocol), Wi-MAX, LTE (Long Term Evolution), Bluetooth, zigbee, NFC (Near Field Communication) or other appropriate communication protocols, including communication protocols not yet developed at the filing date of this application, and may use any of various communication standards, protocols and techniques without being limited to the above.

The GPS (Global Positioning System) receiver 160 receives a satellite signal emitted from a plurality of artificial satellites. The GPS receiver 160 may adopt a C/A (Course/Acquisition) code pseudo-range receiver, a C/A-code carrier receiver, a P-code receiver, a Y-code receiver or the like.

Software components such as an operating system 111, a graphic module (a set of instructions) 112 and a safe log-in program (a set of instructions) 113, are loaded (installed) in the memory 110.

The operating system 111 may be a built-in operating system such as Darwin, RTXC, LINUX, UNIX, OS X, WINDOWS, VxWorks, Tizen, iOS or Android. The operating system 111 includes various software components and/or devices for controlling and managing general system tasks (for example, memory management, storage device control, power management or the like) and promotes communication among various hardware and software components.

The graphic module 112 includes various known software components for providing and displaying a graphic on the display device 141. The term "graphics" includes texts, web pages, icons, digital images, videos, animations or the like, without any limitation, and also includes all objects which can be displayed to the user.

If the second communication device 20 attempts log-in to the web server 40, the safe log-in program 113 acquires authentication-related data and provides the authentication-related data to the web server 40 or the second communication device 20. If a safe log-in application is installed, the safe log-in program 113 is loaded in the memory 110.

Figure 9:
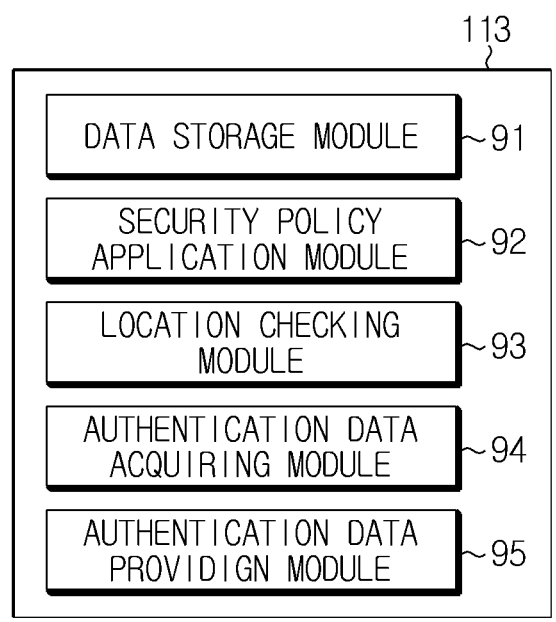
FIG. 9 is a diagram showing a safe log-in program according to an embodiment of the present disclosure.

FIG. 9 is a diagram showing a safe log-in program according to an embodiment of the present disclosure.

As shown in FIG. 9, the safe log-in program 113 according to an embodiment of the present disclosure includes a data storage module 91, a security policy application module 92, a location checking module 93, an authentication data acquiring module 94 and an authentication data providing module 95.

The data storage module 91 stores a security policy table in which a security level of each web site is recorded, namely a security policy table in which web site identification information is mapped with a security level. In an embodiment, the data storage module 91 may classify and store security data, which records log-in authentication information (namely, ID and password) of each web site, for identification information of each communication device. The log-in authentication information is encrypted and stored in the data storage module 91 and is normally decrypted based on the decryption key stored in the second communication device 20. In another embodiment, the data storage module 91 may classify and store at least one decryption key for identification information of each communication device. In another embodiment, the data storage module 91 may classify and store security address data, which records an authentication information storage address of each web site, for identification information of each communication device. Meanwhile, the data storage module 91 may store location information of each second communication device 20 and may also include user authentication information such as password, bio information, resident registration number or the like.

If the second communication device 20 attempts log-in to the web server 40, the security policy application module 92 functions to determine and apply a security level for the log-in authentication information of the second communication device 20 provided to the web server 40. In detail, if the security policy application module 92 receives a log-in notification message from the security relay server 30 through the communication circuit 150, the security policy application module 92 extracts the identification information of the second communication device, the web site identification information and the access token from the log-in notification message, and checks a security level mapped with the web site identification information in the security policy table.

In addition, the security policy application module 92 checks locations of the authentication data providing device 100 and the second communication device 20 by using the location checking module 93. Here, if the authentication data providing device 100 and the second communication device 20 are located at the same place, the checked security level may be applied intactly, but if the authentication data providing device 100 and the second communication device 20 are not located at the same place, a reinforced security level higher than the checked security level may be applied as a security level of the log-in authentication information.

The location checking module 93 determines whether the authentication data providing device 100 and the second communication device 20 are located at the same place. At this time, the location checking module 93 may determine whether the second communication device 20 and the authentication data providing device 100 are located at the same place by checking whether the second communication device 20 and the authentication data providing device 100 are located within the same administrative district or whether a distance between the authentication data providing device 100 and the second communication device 20 is smaller than a threshold distance (for example, 100 m). In addition, the location checking module 93 may also determine whether the second communication device 20 and the authentication data providing device 100 are located at the same place by checking whether the authentication data providing device 100 can make local wireless communication (for example, bluetooth communication) with the second communication device 20 by means of the communication circuit 150.

The location checking module 93 may check location information of the second communication device 20 by extracting identification information of the second communication device from the service notification message received from the security relay server 30 and checking location information mapped with the identification information of the second communication device in the data storage module 91. In addition, if the service notification message received from the security relay server 30 includes location information of the second communication device 20, the location checking module 93 may check location information of the second communication device 20 by extracting the location information from the service notification message. Further, the location checking module 93 may acquire a GPS coordinate by using the GPS receiver 160, and check a location of the authentication data providing device 100 based on the GPS coordinate. In addition, the location checking module 93 may check location information of the authentication data providing device 100 by recognizing a small radio base station allowing local wireless communication through the communication circuit 150, transmitting identification information of the small radio base station to the location checking server 50, and then receiving location information mapped with the identification information of the small radio base station from the location checking server 50.

If it is determined that the second communication device 20 and the authentication data providing device 100 are located at the same place, the location checking module 93 transmits a safe log-in activation message to the second communication device 20.

Meanwhile, if the second communication device 20 makes log-in to the web server 40 successfully, the location checking module 93 continuously monitors locations of the second communication device 20 and the authentication data providing device 100, and if the authentication data providing device 100 and the second communication device 20 are not located at the same place, the location checking module 93 transmits a log-out request message to the web server 40.

The authentication data acquiring module 94 checks a security level applied by the security policy application module 92 and then performs a process for acquiring authentication-related data according to the security level.

The authentication data acquiring module 94 may acquire authentication-related data by checking security data dedicated to the second communication device from a plurality of security data in the data storage module 91 based on the identification information of the communication device included in the log-in notification message, and extracting encrypted log-in authentication information (namely, ID and password) mapped with the web site identification information from the security data. At this time, the authentication data acquiring module 94 may decrypt the extracted encrypted log-in authentication information by using a decryption key received from the second communication device 20.

In another embodiment, the authentication data acquiring module 94 may acquire authentication-related data by extracting a decryption key corresponding to identification information of the second communication device 20 from the data storage module 91, based on the identification information of the second communication device included in the log-in notification message.

In another embodiment, the authentication data acquiring module 94 may acquire authentication-related data by checking storage address data dedicated to the second communication device from data storage module 91 based on the identification information of the second communication device included in the log-in notification message, and extracting encrypted authentication information storage address mapped with the web site identification information from the storage address data.

The authentication data acquiring module 94 performs a process of acquiring authentication-related data based on the security level applied by the security policy application module 92. In other words, if the security level applied by the security policy application module 92 is a first level, the authentication data acquiring module 94 instantly acquires authentication-related data (namely, log-in authentication information, a decryption key or an authentication information storage address). If the security level applied by the security policy application module 92 is a second level, the authentication data acquiring module 94 notifies that the second communication device 20 is attempting log-in to the web site and outputs a notification window to the display device 141 to inquire whether or not to approve the log-in. Here, the authentication data acquiring module 94 performs a process of acquiring authentication-related data only when an approval signal is input by the user.

Meanwhile, if the security level applied by the security policy application module 92 is a third level, the authentication data acquiring module 94 outputs an input window to the display device 141 to request an input of reinforced authentication information, and acquires reinforced authentication information such as bio information or OTP input through the input window as the authentication-related data. In addition, if the security level applied by the security policy application module 92 is a third level, the authentication data acquiring module 94 outputs an authentication input window to the display device 141 to allow the user to input user authentication information. Here, if the user authentication information input through the authentication input window is accurate, the authentication data acquiring module 94 performs a process of acquiring authentication-related data, but if the user authentication information is not accurate, the authentication data acquiring module 94 does not perform a process of acquiring authentication-related data. In other words, if the security level is a third level, the authentication data acquiring module 94 performs user authentication, and if the user authentication is successful, the authentication-related data may be acquired.

The authentication data providing module 95 provides the authentication-related data acquired by the authentication data acquiring module 94 to the web server 40 or the second communication device 20. When the authentication data providing module 95 provides the authentication-related data to the web server 40, the authentication data providing module 95 checks the web site identification information and the access token in the log-in notification message, and transmits the authentication-related data and the access token together to the web server 40 endowed with the web site identification information.

Figure 10:
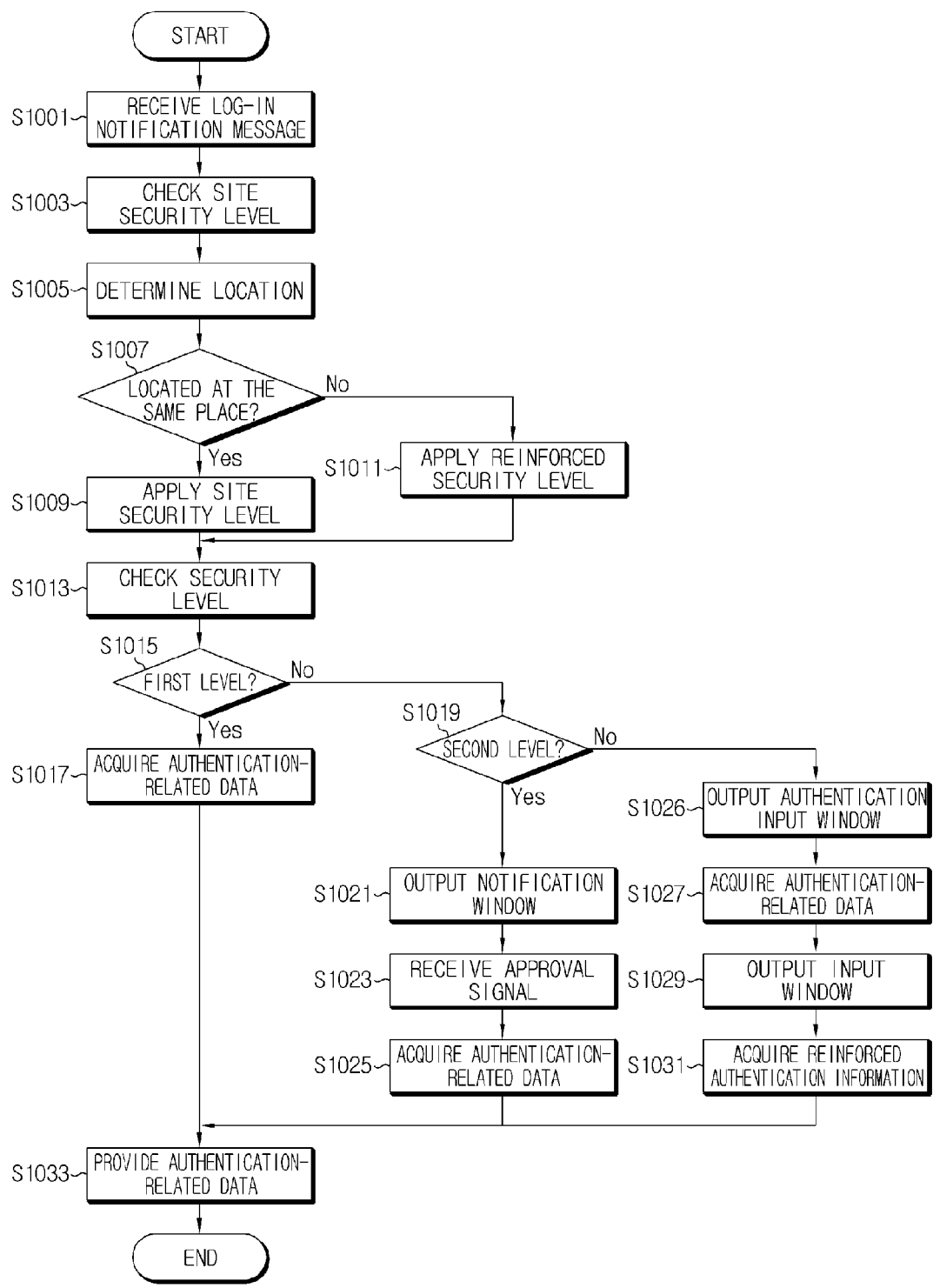
FIG. 10 is a flowchart for illustrating a method for providing authentication-related data in the authentication data providing device according to an embodiment of the present disclosure.

FIG. 10 is a flowchart for illustrating a method for providing authentication-related data in the authentication data providing device according to an embodiment of the present disclosure.

Referring to FIG. 10, when the second communication device 20 attempts log-in to the web server 40, the communication circuit 150 receives a log-in notification message notifying that the second communication device 20 is attempting log-in to the web server 40, from the security relay server 30 (S1001).

If so, the security policy application module 92 checks a security level of a web site accessed by the second communication device 20 by extracting identification information of the second communication device, web site identification information and access token from the log-in notification message, and checking a security level mapped with the web site identification information from the security policy table of the data storage module 91 (S1003). Next, the security policy application module 92 requests to determine whether the authentication data providing device 100 and the second communication device 20 are located at the same place.

If so, the location checking module 93 determines whether the second communication device 20 and the authentication data providing device 100 are located at the same place by checking location information of the authentication data providing device 100 and the second communication device 20, respectively, and then comparing the location information of the authentication data providing device 100 and the second communication device 20 (S1005). At this time, the location checking module 93 may determine whether the second communication device 20 and the authentication data providing device 100 are located at the same place by checking whether the second communication device 20 and the authentication data providing device 100 are located within the same administrative district or whether a distance between the authentication data providing device 100 and the second communication device 20 is smaller than a threshold distance (for example, 100 m).

In addition, the location checking module 93 may also determine whether the second communication device 20 and the authentication data providing device 100 are located at the same place by checking whether the authentication data providing device 100 can make local wireless communication (for example, bluetooth communication) with the second communication device 20 by means of the communication circuit 150.

Meanwhile, the location checking module 93 may check location information of the second communication device 20 in advance by extracting identification information of the second communication device from the service notification message received from the security relay server 30 and checking location information mapped with the identification information in the data storage module 91. In addition, if the service notification message includes location information of the second communication device 20, the location checking module 93 may check location information of the second communication device 20 by extracting the location information from the service notification message. Further, the location checking module 93 may acquire a GPS coordinate by using the GPS receiver 160, and check a location of the authentication data providing device 100 based on the GPS coordinate. In addition, the location checking module 93 may check location information of the authentication data providing device 100 by recognizing a small radio base station allowing local wireless communication through the communication circuit 150, transmitting identification information of the small radio base station to the location checking server 50, and then receiving location information mapped with the identification information of the small radio base station from the location checking server 50.

If the security policy application module 92 receives a determination result from the location checking module 93, the security policy application module 92 checks whether the authentication data providing device 100 and the second communication device 20 are located at the same place, based on the determination result (S1007).

Then, if the authentication data providing device 100 and the second communication device 20 are located at the same place, the security policy application module 92 applies the site security level checked in Step S1003 intactly as a security level of the log-in authentication information (S1009).

Meanwhile, if it is checked that the second communication device 20 and the authentication data providing device 100 are not located at the same place, the security policy application module 92 applies a reinforced security level higher than the security level checked in Step S1003 by one level as a security level of the log-in authentication information (S1011). At this time, if the security level checked in Step S1003 is a highest level (namely, if there is no higher security level), the security policy application module 92 may apply the security level of Step S1003 intactly or transmit a message to the second communication device 20 through the communication circuit 150 to notify that log-in is not available, without performing the process of providing authentication-related data any more. Meanwhile, if it is checked that the second communication device 20 and the authentication data providing device 100 are not located at the same place, the security policy application module 92 does not perform the process of providing authentication-related data any more but may transmit a message to the second communication device 20 through the communication circuit 150 to notify that log-in is not available.

Next, the authentication data acquiring module 94 checks the security level applied by the security policy application module 92 (S1013).

Subsequently, if the checked security level is a first level (S1015), the authentication data acquiring module 94 performs a process of acquiring authentication-related data, thereby acquiring any one of encrypted log-in authentication information, decrypted log-in authentication information, decryption key, authentication information storage address, and reinforced authentication information (S1017).

At this time, the authentication data acquiring module 94 may acquire authentication-related data by receiving a decryption key from the second communication device 20 and decrypting the encrypted log-in authentication information of the web site by using the decryption key. In this case, the authentication data acquiring module 94 acquires the decryption key by extracting identification information of the second communication device from the log-in notification message and requesting and receiving the decryption key to/from the second communication device 20 having the identification information through the communication circuit 150. In addition, the authentication data acquiring module 94 checks security data dedicated to the second communication device from security data classified for each communication device in the data storage module 91, based on the identification information of the second communication device. Subsequently, the authentication data acquiring module 94 may acquire authentication-related data by extracting encrypted log-in authentication information (namely, ID and password) mapped with the web site identification information from the log-in authentication information included in the security data dedicated to the second communication device and then decrypting the log-in authentication information by using the decryption key to obtain log-in authentication information.

In addition, the authentication data acquiring module 94 may acquire authentication-related data by checking security data dedicated to the second communication device from security data classified for each communication device based on the identification information of the communication device, and extracting encrypted log-in authentication information (namely, ID and password) mapped with the web site identification information from log-in authentication information included the checked security data.

In another embodiment, the authentication data acquiring module 94 may acquire authentication-related data by extracting a decryption key corresponding to identification information of the second communication device 20 from the data storage module 91.

In another embodiment, the authentication data acquiring module 94 may acquire authentication-related data by checking storage address data mapped with the identification information of the second communication device, and extracting encrypted authentication information storage address mapped with the web site identification information included in the log-in notification message of the checked storage address data.

Meanwhile, if the checked security level is a second level (S1019), the authentication data acquiring module 94 notifies that the second communication device 20 is attempting log-in to the web site and also outputs a notification window to the display device 141 to inquire whether or not to approve the log-in (S1021). For example, the authentication data acquiring module 94 may output a notification window such as "An access to "www.~~~~~.com" is attempted from a remote point. Do you approve the log-in?" to the display device 141. In addition, only when an approval signal is input by the user (S1023), the authentication data acquiring module 94 acquires authentication-related data (namely, decrypted log-in authentication information, encrypted log-in authentication information, decryption key or authentication information storage address) (S1025).

Meanwhile, if the checked security level is a third level, the authentication data acquiring module 94 an authentication input window to the display device 141 so that the user performs user authentication (S1026). For example, the authentication data acquiring module 94 may output an authentication input window "An access to "www.~~~~~.com" is attempted from a remote point. Please input the password if you approve the log-in." to the display device 141. Next, if the user authentication information input through the authentication input window is identical to the user authentication information stored in the data storage module 91, the authentication data acquiring module 94 acquires authentication-related data (namely, decrypted log-in authentication information, encrypted log-in authentication information, decryption key or authentication information storage address) as in the first level (S1027). Subsequently, the authentication data acquiring module 94 additionally acquires authentication-related data by outputting an input window to the display device 141 to request an input of reinforced authentication information (S1029), and receiving reinforced authentication information such as bio information, OTP or the like from the user through the input window (S1031). The authentication data acquiring module 94 may encrypt the reinforced authentication information by means of a predetermined encrypting algorithm. Meanwhile, if the security level is a third level and the user authentication is successful, the authentication data acquiring module 94 may acquire at least one of authentication-related data except for reinforced authentication information, namely at least one of decrypted log-in authentication information, encrypted log-in authentication information, decryption key, and authentication information storage address, or may acquire only reinforced authentication information.

Next, the authentication data providing module 95 provide the acquired authentication-related data to the web server 40 or the second communication device 20, which is endowed with the web site identification information, to the communication circuit 150 (S1033). At this time, if the authentication data providing module 95 transmits authentication-related data to the web server 40, the authentication data providing module 95 transmits an access token extracted from the log-in notification message together so that log-in authentication of the second communication device 20 is performed at the web server 40.

Meanwhile, if the security level is a third level, the authentication data acquiring module 95 may acquire only reinforced authentication information as the authentication-related data. In this case, the authentication data providing module 95 provides reinforced authentication information to the web server 40 or the second communication device 20, without transmitting log-in authentication information, decryption key, authentication information storage address or the like.

Figure 11:
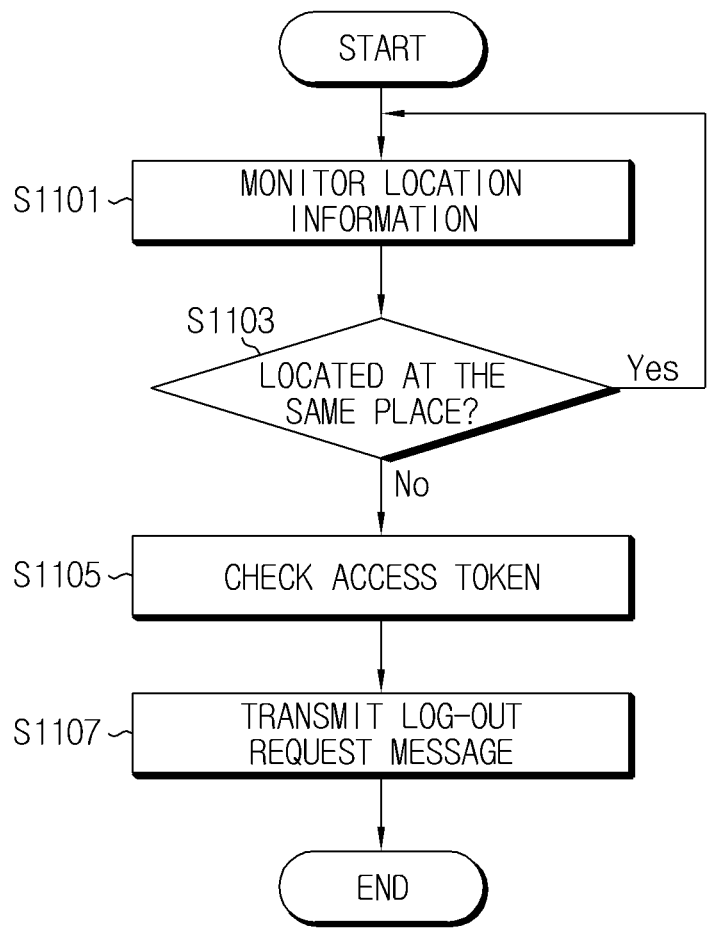
FIG. 11 is a flowchart for illustrating a method for compulsory log-out of a communication device in the authentication data providing device according to an embodiment of the present disclosure.

FIG. 11 is a flowchart for illustrating a method for compulsory log-out of a communication device in the authentication data providing device according to an embodiment of the present disclosure.

Referring to FIG. 11, if the second communication device 20 performs log-in to the web server 40 successfully to receive service, the location checking module 93 continuously monitors location information of the authentication data providing device 100 by using the GPS receiver 160 (S1101). In other words, if a log-in success of the second communication device 20 is notified from the web server 40, the location checking module 93 continuously monitors location information of the authentication data providing device 100. If the second communication device 20 is a communication terminal available for mobile communication, the authentication data providing device 100 continuously receive location information of the second communication device 20 to monitor the location information of the second communication device 20.

Next, based on the monitored location information, the location checking module 93 determines whether the authentication data providing device 100 and the second communication device 20 are continuously located at the same place (S1103). At this time, the location checking module 93 may determine whether the second communication device 20 and the authentication data providing device 100 are located at the same place by checking whether the second communication device 20 and the authentication data providing device 100 are located within the same administrative district or whether a distance between the authentication data providing device 100 and the second communication device 20 is smaller than a threshold distance (for example, 100 m). In addition, the location checking module 93 may also determine whether the second communication device 20 and the authentication data providing device 100 are continuously located at the same place by checking whether the authentication data providing device 100 can make local wireless communication (for example, bluetooth communication) with the second communication device 20 by means of the communication circuit 150.

If it is checked that the second communication device 20 and the authentication data providing device 100 are located at the same place, the location checking module 93 performs Step S1101 again. Meanwhile, if it is checked that the second communication device 20 and the authentication data providing device 100 are not located at the same place, the location checking module 93 checks an access token from the log-in notification message received from the security relay server 30 (S1105). In addition, the location checking module 93 transmits the log-out request message included in the access token to the web server 40 so that the second communication device 20 logged in the web server 40 is compulsorily logged out (S1107).

While this specification contains many features, the features should not be construed as limitations on the scope of the disclosure or the appended claims. Certain features described in the context of separate exemplary embodiments can also be implemented in combination in a single exemplary embodiment. Conversely, various features described in the context of a single exemplary embodiment can also be implemented in multiple exemplary embodiments separately or in any suitable sub combination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under a particular environment. Also, it should be understood that all exemplary embodiments do not require the distinction of various system components made in the above mentioned embodiment. The program components and systems may be generally implemented as a single software product or multiple software product packages.

The above mentioned method of the present disclosure may be implemented as program instructions and recorded in non-transitory computer-readable media (such as, for example, a compact disk-read only memory (CD ROM), random access memory (RAM), read-only memory (ROM), floppy disks, hard disks, magneto-optical disks, and the like). This process may be easily performed by person having ordinary skill in the technical field to which the present disclosure belongs, and its detailed description is omitted herein.

It should be noted various substitutions, modifications, and changes may be made to the present disclosure by person having ordinary skill in the technical field to which the present disclosure belongs without departing from the spirit and scope of the present disclosure, and the present disclosure is not limited by the above described embodiments and the accompanying drawings.

What is claimed is:

1. A safe log-in method for allowing a safe log-in of a communication device which accesses a web site, the method comprising:
    by an authentication data providing device, receiving a log-in notification message from a security relay server notifying that a communication device is attempting log-in;
    by the authentication providing device, determining whether the authentication data providing device and the communication device are located at a same place;
    by the authentication data providing device, acquiring authentication-related data of the communication device when the authentication data providing device and the communication device are located at the same place;
    by the authentication data providing device, providing the acquired authentication-related data to the communication device or the web site; and
    by the authentication data providing device, checking a security level of the web site accessed by the communication device by extracting web site identification information from the log-in notification message, and checking a security level mapped with the web site identification information from a security policy table;
    wherein said acquiring of authentication-related data by the authentication data providing device includes:
        requesting a decryption key to the communication device and receiving the decryption key from the communication device;
        extracting encrypted log-in authentication information, and decrypting the extracted log-in authentication information by using the decryption key;
        applying the checked security level when the authentication data providing device and the communication device are located at the same place; and
        acquiring the authentication-related data based on the applied security level; and
    wherein said providing of the authentication-related data includes providing the decrypted log-in authentication information to the web site or the communication device.

2. The safe log-in method according to claim 1, further comprising:
    by the authentication data providing device, checking an access token of the communication device,
    wherein said providing of the authentication-related data includes providing the access token to the web site together with the decrypted log-in authentication information.

3. A safe log-in method for allowing a safe log-in of a communication device which accesses a web site, the method comprising:
    by an authentication data providing device, receiving a log-in notification message from a security relay server notifying that a communication device is attempting log-in;
    by the authentication providing device, determining whether the authentication data providing device and the communication device are located at a same place;
    by the authentication data providing device, acquiring authentication-related data of the communication device when the authentication data providing device and the communication device are located at the same place;
    by the authentication data providing device, providing the acquired authentication-related data to the communication device or the web site; and
    by the authentication data providing device, checking a security level of the web site accessed by the communication device by extracting web site identification information from the log-in notification message, and checking a security level mapped with the web site identification information from a security policy table;

wherein said acquiring of authentication-related data by the authentication providing device includes extracting encrypted log-in authentication information, applying the checked security level when the authentication data providing device and the communication device are located at the same place, and acquiring the authentication-related data based on the applied security level, wherein said providing of the authentication-related data by the authentication providing device includes providing the extracted encrypted log-in authentication information to the communication device, and wherein the method further comprises:

by the communication device, decrypting the encrypted log-in authentication information received from the authentication data providing device by using a decryption key which is already stored; and by the communication device, performing an authentication for the web site by using the decrypted log-in authentication information.

4. A safe log-in method for allowing a safe log-in of a communication device which accesses a web site, the method comprising:

by an authentication data providing device, receiving a log-in notification message from a security relay server notifying that a communication device is attempting log-in;

by the authentication providing device, determining whether the authentication data providing device and the communication device are located at a same place;

by the authentication data providing device, acquiring authentication-related data of the communication device when the authentication data providing device and the communication device are located at the same place;

by the authentication data providing device, providing the acquired authentication-related data to the communication device or the web site; and by the authentication data providing device, checking a security level of the web site accessed by the communication device by extracting web site identification information from the log-in notification message, and checking a security level mapped with the web site identification information from a security policy table;

wherein said acquiring of authentication-related data by the authentication providing device includes extracting a decryption key, applying the checked security level when the authentication data providing device and the communication device are located at the same place, and acquiring the authentication-related data based on the applied security level, wherein said providing of the authentication-related data by the authentication providing device includes providing the extracted decryption key to the communication device, and wherein the method further comprises:

by the communication device, decrypting encrypted log-in authentication information, which is already stored, by using the decryption key, and by the communication device, performing an authentication for the web site by using the decrypted log-in authentication information.

5. A safe log-in method for allowing a safe log-in of a communication device which accesses a web site, the method comprising:

by an authentication data providing device, receiving a log-in notification message from a security relay server notifying that a communication device is attempting log-in;

by the authentication providing device, determining whether the authentication data providing device and the communication device are located at a same place;

by the authentication data providing device, acquiring authentication-related data of the communication device when the authentication data providing device and the communication device are located at the same place;

by the authentication data providing device, providing the acquired authentication-related data to the communication device or the web site; and by the authentication data providing device, checking a security level of the web site accessed by the communication device by extracting web site identification information from the log-in notification message, and checking a security level mapped with the web site identification information from a security policy table;

wherein said acquiring of authentication-related data by the authentication providing device includes extracting an authentication information storage address, applying the checked security level when the authentication data providing device and the communication device are located at the same place, and acquiring the authentication-related data based on the applied security level wherein said providing of the authentication-related data by the authentication providing device includes providing the extracted authentication information storage address to the communication device, and wherein the method further comprises:

by the communication device, decrypting the authentication information storage address received from the authentication data providing device;

by the communication device, receiving authentication information stored in the decrypted authentication information storage address from an authentication information storage server; and by the communication device, performing an authentication for the web site by using the received authentication information.

6. The safe log-in method according to claim 1, wherein said acquiring of authentication-related data includes:

applying a reinforced security level higher than the checked security level when the authentication data providing device and the communication device are not located at the same place.

7. The safe log-in method according to claim 6, wherein said acquiring of authentication-related data includes acquiring reinforced authentication information when the applied security level is higher than a threshold level, and wherein said providing of the authentication-related data includes providing the reinforced authentication information to the web site or the communication device.

8. The safe log-in method according to claim 6, wherein said acquiring of authentication-related data includes acquiring the authentication-related data when a user performs user authentication successfully, in case the applied security level is higher than a threshold level.

9. The safe log-in method according to claim 6, wherein said acquiring of authentication-related data includes:

outputting a notification window for requesting the communication device to allow log-in when the applied security level is a preset specific security level; and acquiring the authentication-related data when an approval signal is input through the notification window.

10. The safe log-in method according to claim 1, after said providing of the authentication-related data, further comprising:

by the authentication data providing device, monitoring whether the authentication data providing device and the communication device are continuously located at the same place; and by the authentication data providing device, performing log-out of the communication device when the authentication data providing device and the communication device are not continuously located at the same place.

11. The safe log-in method according to claim 1, further comprising:

by the authentication data providing device, providing a safe log-in activation message to the communication device when it is determined that the authentication data providing device and the communication device are located at the same place.

12. An authentication data providing device, comprising:

at least one processor;
a communication circuit;
a memory;
a data storage module configured to store encrypted log-in authentication information; and
at least one program stored in the memory and configured to be executed by the at least one processor,
wherein the communication circuit receives a log-in notification message notifying that a communication device is attempting log-in, from a security relay server,
wherein the program includes:
  a location checking module configured to determine whether the communication device is located at a same place as the authentication data providing device;
  an authentication data acquiring module configured to acquire authentication-related data of a web site accessed by the communication device when the location checking module determines that the communication device and the authentication data providing device are located at the same place; and
  an authentication data providing module configured to provide the acquired authentication-related data to the web site or the communication device;
wherein the authentication data acquiring module requests a decryption key to the communication device and receives the decryption key from the communication device, then extracts encrypted log-in authentication information stored in the data storage module, and decrypts the extracted encrypted log-in authentication information by using the decryption key,
wherein the authentication data acquiring module checks a security level of the web site accessed by the communication device by extracting web site identification information from the log-in notification message, checks a security level mapped with the web site identification information from a security policy table, applies the checked security level when the authentication data providing device and the communication device are located at the same place; and acquires the authentication-related data based on the applied security level, and
wherein the authentication data providing module provides the decrypted log-in authentication information to the web site or the communication device.

13. The authentication data providing device according to claim 12,
wherein the authentication data providing module checks an access token of the communication device and provides the access token to the web site together with the decrypted log-in authentication information.

14. An authentication data providing device, comprising:
at least one processor;
a communication circuit;
a memory;
a data storage module configured to store encrypted log-in authentication information; and
at least one program stored in the memory and configured to be executed by the at least one processor,
wherein the communication circuit receives a log-in notification message notifying that a communication device is attempting log-in, from a security relay server,
wherein the program includes:
  a location checking module configured to determine whether the communication device is located at a same place as the authentication data providing device;
  an authentication data acquiring module configured to acquire authentication-related data of a web site accessed by the communication device when the location checking module determines that the communication device and the authentication data providing device are located at the same place; and
  an authentication data providing module configured to provide the acquired authentication-related data to the web site or the communication device;
wherein the authentication data acquiring module extracts encrypted log-in authentication information stored in the data storage module,
wherein the authentication data acquiring module checks a security level of the web site accessed by the communication device by extracting web site identification information from the log-in notification message, checks a security level mapped with the web site identification information from a security policy table, applies the checked security level when the authentication data providing device and the communication device are located at the same place; and acquires the authentication-related data based on the applied security level, and
wherein the authentication data providing module provides the extracted encrypted log-in authentication information to the communication device.

15. An authentication data providing device, comprising:
at least one processor;
a communication circuit;
a memory;
a data storage module configured to store a decryption key for decrypting encrypted log-in authentication information stored in a communication device; and
at least one program stored in the memory and configured to be executed by the at least one processor,
wherein the communication circuit receives a log-in notification message notifying that a communication device is attempting log-in, from a security relay server, wherein the program includes:
  a location checking module configured to determine whether the communication device is located at a same place as the authentication data providing device;
  an authentication data acquiring module configured to acquire authentication-related data of a web site accessed by the communication device when the location checking module determines that the communication device and the authentication data providing device are located at the same place; and
  an authentication data providing module configured to provide the acquired authentication-related data to the web site or the communication device;
  wherein the authentication data acquiring module extracts a decryption key from the data storage module,
  wherein the authentication data acquiring module checks a security level of the web site accessed by the communication device by extracting web site identification information from the log-in notification message, checks a security level mapped with the web site identification information from a security policy table, applies the checked security level when the authentication data providing device and the communication device are located at the same place; and acquires the authentication-related data based on the applied security level, and
  wherein the authentication data providing module provides the extracted decryption key to the communication device.

16. An authentication data providing device, comprising:
at least one processor;
a communication circuit;
a memory;
a data storage module configured to store an authentication information storage address at which log-in authentication information is stored; and
at least one program stored in the memory and configured to be executed by the at least one processor,
wherein the communication circuit receives a log-in notification message notifying that a communication device is attempting log-in, from a security relay server,
wherein the program includes:
  a location checking module configured to determine whether the communication device is located at a same place as the authentication data providing device;
  an authentication data acquiring module configured to acquire authentication-related data of a web site accessed by the communication device when the location checking module determines that the communication device and the authentication data providing device are located at the same place; and
  an authentication data providing module configured to provide the acquired authentication-related data to the web site or the communication device;
  wherein the authentication data acquiring module extracts an authentication information storage address of the web site from the data storage module,
  wherein the authentication data acquiring module checks a security level of the web site accessed by the communication device by extracting web site identification information from the log-in notification message, checks a security level mapped with the web site identification information from a security policy table, applies the checked security level when the authentication data providing device and the communication device are located at the same place; and acquires the authentication-related data based on the applied security level, and
  wherein the authentication data providing module provides the extracted authentication information storage address to the communication device.

17. The authentication data providing device according to claim 12, further comprising:
  a security policy application module configured to check a security level of the web site, and apply the checked security level when the location checking module determines that the communication device and the authentication data providing device are located at the same place,
  wherein the authentication data acquiring module acquires the authentication-related data based on the security level applied by the security policy application module.

18. The authentication data providing device according to claim 17,
  wherein the security policy application module applies a reinforced security level higher than the checked security level when the communication device and the authentication data providing device are not located at the same place.

19. The authentication data providing device according to claim 18,
  wherein the authentication data acquiring module acquires reinforced authentication information when the security level applied by the security policy application module is higher than a threshold level, and
  wherein the authentication data providing module provides the reinforced authentication information to the web site or the communication device.

20. The authentication data providing device according to claim 18,
  wherein the authentication data acquiring module acquires the authentication-related data when a user performs user authentication successfully, in case the security level applied by the security policy application module is higher than a threshold level.

21. The authentication data providing device according to claim 19,
  wherein in case the security level applied by the security policy application module is a preset specific security level, the authentication data acquiring module outputs a notification window for requesting the communication device to allow log-in, and acquires the authentication-related data when an approval signal is input through the notification window.

22. The authentication data providing device according to claim 12,
  wherein in case the communication device successfully logs in the web site, the location checking module monitors whether the communication device and the authentication data providing device are continuously located at the same place, and performs log-out of the communication device when the communication device and the authentication data providing device are not located at the same place.

23. The authentication data providing device according to claim 12,
  wherein when it is determined that the communication device and the authentication data providing device are located at the same place, the location checking module transmits a safe log-in activation message to the communication device to activate a safe log-in menu of the communication device.

24. The safe log-in method according to claim 3, further comprising:
by the authentication data providing device, checking a security level of the web site accessed by the communication device by extracting web site identification information from the log-in notification message, and checking a security level mapped with the web site identification information from the security policy table,
wherein said acquiring of authentication-related data includes:
applying the checked security level when the authentication data providing device and the communication device are located at the same place; and
acquiring the authentication-related data based on the applied security level.

25. The safe log-in method according to claim 24,
wherein said acquiring of authentication-related data includes:
applying a reinforced security level higher than the checked security level when the authentication data providing device and the communication device are not located at the same place.

26. The safe log-in method according to claim 25,
wherein said acquiring of authentication-related data includes acquiring reinforced authentication information when the applied security level is higher than a threshold level, and
wherein said providing of the authentication-related data includes providing the reinforced authentication information to the web site or the communication device.

27. The safe log-in method according to claim 25,
wherein said acquiring of authentication-related data includes acquiring the authentication-related data when a user performs user authentication successfully, in case the applied security level is higher than a threshold level.

28. The safe log-in method according to claim 25,
wherein said acquiring of authentication-related data includes:
outputting a notification window for requesting the communication device to allow log-in when the applied security level is a preset specific security level; and
acquiring the authentication-related data when an approval signal is input through the notification window.

29. The safe log-in method according to claim 4, further comprising:
by the authentication data providing device, checking a security level of the web site accessed by the communication device by extracting web site identification information from the log-in notification message, and checking a security level mapped with the web site identification information from the security policy table,
wherein said acquiring of authentication-related data includes:
applying the checked security level when the authentication data providing device and the communication device are located at the same place; and
acquiring the authentication-related data based on the applied security level.

30. The safe log-in method according to claim 29,
wherein said acquiring of authentication-related data includes:
applying a reinforced security level higher than the checked security level when the authentication data providing device and the communication device are not located at the same place.

31. The safe log-in method according to claim 30,
wherein said acquiring of authentication-related data includes acquiring reinforced authentication information when the applied security level is higher than a threshold level, and
wherein said providing of the authentication-related data includes providing the reinforced authentication information to the web site or the communication device.

32. The safe log-in method according to claim 30,
wherein said acquiring of authentication-related data includes acquiring the authentication-related data when a user performs user authentication successfully, in case the applied security level is higher than a threshold level.

33. The safe log-in method according to claim 30,
wherein said acquiring of authentication-related data includes:
outputting a notification window for requesting the communication device to allow log-in when the applied security level is a preset specific security level; and
acquiring the authentication-related data when an approval signal is input through the notification window.

34. The safe log-in method according to claim 5, further comprising:
by the authentication data providing device, checking a security level of the web site accessed by the communication device by extracting web site identification information from the log-in notification message, and checking a security level mapped with the web site identification information from the security policy table,
wherein said acquiring of authentication-related data includes:
applying the checked security level when the authentication data providing device and the communication device are located at the same place; and
acquiring the authentication-related data based on the applied security level.

35. The safe log-in method according to claim 34,
wherein said acquiring of authentication-related data includes:
applying a reinforced security level higher than the checked security level when the authentication data providing device and the communication device are not located at the same place.

36. The safe log-in method according to claim 35,
wherein said acquiring of authentication-related data includes acquiring reinforced authentication information when the applied security level is higher than a threshold level, and
wherein said providing of the authentication-related data includes providing the reinforced authentication information to the web site or the communication device.

37. The safe log-in method according to claim 35,
wherein said acquiring of authentication-related data includes acquiring the authentication-related data when a user performs user authentication successfully, in case the applied security level is higher than a threshold level.

38. The safe log-in method according to claim 35,
wherein said acquiring of authentication-related data includes:
outputting a notification window for requesting the communication device to allow log-in when the applied security level is a preset specific security level; and
acquiring the authentication-related data when an approval signal is input through the notification window.

39. The safe log-in method according to claim 3, after said providing of the authentication-related data, further comprising:
by the authentication data providing device, monitoring whether the authentication data providing device and the communication device are continuously located at the same place; and
by the authentication data providing device, performing log-out of the communication device when the authentication data providing device and the communication device are not continuously located at the same place.

40. The safe log-in method according to claim 4, after said providing of the authentication-related data, further comprising:
by the authentication data providing device, monitoring whether the authentication data providing device and the communication device are continuously located at the same place; and
by the authentication data providing device, performing log-out of the communication device when the authentication data providing device and the communication device are not continuously located at the same place.

41. The safe log-in method according to claim 5, after said providing of the authentication-related data, further comprising:
by the authentication data providing device, monitoring whether the authentication data providing device and the communication device are continuously located at the same place; and
by the authentication data providing device, performing log-out of the communication device when the authentication data providing device and the communication device are not continuously located at the same place.

42. The safe log-in method according to claim 3, further comprising:
by the authentication data providing device, providing a safe log-in activation message to the communication device when it is determined that the authentication data providing device and the communication device are located at the same place.

43. The safe log-in method according to claim 4, further comprising:
by the authentication data providing device, providing a safe log-in activation message to the communication device when it is determined that the authentication data providing device and the communication device are located at the same place.

44. The safe log-in method according to claim 5, further comprising:
by the authentication data providing device, providing a safe log-in activation message to the communication device when it is determined that the authentication data providing device and the communication device are located at the same place.

45. The authentication data providing device according to claim 14, further comprising:
a security policy application module configured to check a security level of the web site, and apply the checked security level when the location checking module determines that the communication device and the authentication data providing device are located at the same place,
wherein the authentication data acquiring module acquires the authentication-related data based on the security level applied by the security policy application module.

46. The authentication data providing device according to claim 45,
wherein the security policy application module applies a reinforced security level higher than the checked security level when the communication device and the authentication data providing device are not located at the same place.

47. The authentication data providing device according to claim 46,
wherein the authentication data acquiring module acquires reinforced authentication information when the security level applied by the security policy application module is higher than a threshold level, and
wherein the authentication data providing module provides the reinforced authentication information to the web site or the communication device.

48. The authentication data providing device according to claim 46,
wherein the authentication data acquiring module acquires the authentication-related data when a user performs user authentication successfully, in case the security level applied by the security policy application module is higher than a threshold level.

49. The authentication data providing device according to claim 46,
wherein in case the security level applied by the security policy application module is a preset specific security level, the authentication data acquiring module outputs a notification window for requesting the communication device to allow log-in, and acquires the authentication-related data when an approval signal is input through the notification window.

50. The authentication data providing device according to claim 15, further comprising:
a security policy application module configured to check a security level of the web site, and apply the checked security level when the location checking module determines that the communication device and the authentication data providing device are located at the same place,
wherein the authentication data acquiring module acquires the authentication-related data based on the security level applied by the security policy application module.

51. The authentication data providing device according to claim 50,
wherein the security policy application module applies a reinforced security level higher than the checked security level when the communication device and the authentication data providing device are not located at the same place.

52. The authentication data providing device according to claim 51,
wherein the authentication data acquiring module acquires reinforced authentication information when the security level applied by the security policy application module is higher than a threshold level, and wherein the authentication data providing module provides the reinforced authentication information to the web site or the communication device.

53. The authentication data providing device according to claim 51,
wherein the authentication data acquiring module acquires the authentication-related data when a user performs user authentication successfully, in case the security level applied by the security policy application module is higher than a threshold level.

54. The authentication data providing device according to claim 51,
wherein in case the security level applied by the security policy application module is a preset specific security level, the authentication data acquiring module outputs a notification window for requesting the communication device to allow log-in, and acquires the authentication-related data when an approval signal is input through the notification window.

55. The authentication data providing device according to claim 16, further comprising:
a security policy application module configured to check a security level of the web site, and apply the checked security level when the location checking module determines that the communication device and the authentication data providing device are located at the same place,
wherein the authentication data acquiring module acquires the authentication-related data based on the security level applied by the security policy application module.

56. The authentication data providing device according to claim 55,
wherein the security policy application module applies a reinforced security level higher than the checked security level when the communication device and the authentication data providing device are not located at the same place.

57. The authentication data providing device according to claim 56,
wherein the authentication data acquiring module acquires reinforced authentication information when the security level applied by the security policy application module is higher than a threshold level, and
wherein the authentication data providing module provides the reinforced authentication information to the web site or the communication device.

58. The authentication data providing device according to claim 56,
wherein the authentication data acquiring module acquires the authentication-related data when a user performs user authentication successfully, in case the security level applied by the security policy application module is higher than a threshold level.

59. The authentication data providing device according to claim 56,
wherein in case the security level applied by the security policy application module is a preset specific security level, the authentication data acquiring module outputs a notification window for requesting the communication device to allow log-in, and acquires the authentication-related data when an approval signal is input through the notification window.

60. The authentication data providing device according to claim 14,
wherein in case the communication device successfully logs in the web site, the location checking module monitors whether the communication device and the authentication data providing device are continuously located at the same place, and performs log-out of the communication device when the communication device and the authentication data providing device are not located at the same place.

61. The authentication data providing device according to claim 15,
wherein in case the communication device successfully logs in the web site, the location checking module monitors whether the communication device and the authentication data providing device are continuously located at the same place, and performs log-out of the communication device when the communication device and the authentication data providing device are not located at the same place.

62. The authentication data providing device according to claim 16,
wherein in case the communication device successfully logs in the web site, the location checking module monitors whether the communication device and the authentication data providing device are continuously located at the same place, and performs log-out of the communication device when the communication device and the authentication data providing device are not located at the same place.

63. The authentication data providing device according to claim 14,
wherein when it is determined that the communication device and the authentication data providing device are located at the same place, the location checking module transmits a safe log-in activation message to the communication device to activate a safe log-in menu of the communication device.

64. The authentication data providing device according to claim 15,
wherein when it is determined that the communication device and the authentication data providing device are located at the same place, the location checking module transmits a safe log-in activation message to the communication device to activate a safe log-in menu of the communication device.

65. The authentication data providing device according to claim 16,
wherein when it is determined that the communication device and the authentication data providing device are located at the same place, the location checking module transmits a safe log-in activation message to the communication device to activate a safe log-in menu of the communication device.

* * * * *